(12) United States Patent
Iwakoshi

(10) Patent No.: US 10,054,878 B2
(45) Date of Patent: Aug. 21, 2018

(54) DRIVING FORCE TRANSMISSION APPARATUS AND IMAGE FORMING APPARATUS

(71) Applicant: CANON KABUSHIKI KAISHA, Tokyo (JP)

(72) Inventor: Tomoyuki Iwakoshi, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/295,045

(22) Filed: Oct. 17, 2016

(65) Prior Publication Data

US 2017/0131662 A1    May 11, 2017

(30) Foreign Application Priority Data

Nov. 9, 2015 (JP) .................. 2015-219603

(51) Int. Cl.
| | |
|---|---|
| G03G 15/16 | (2006.01) |
| F16H 1/00 | (2006.01) |
| F16H 55/17 | (2006.01) |
| F16H 1/20 | (2006.01) |
| G03G 15/01 | (2006.01) |
| G03G 21/16 | (2006.01) |
| F16H 35/00 | (2006.01) |
| F16H 1/06 | (2006.01) |

(52) U.S. Cl.
CPC .......... *G03G 15/1615* (2013.01); *F16H 1/20* (2013.01); *F16H 1/206* (2013.01); *F16H 55/17* (2013.01); *G03G 15/0136* (2013.01); *G03G 21/1647* (2013.01); *F16H 1/06* (2013.01); *F16H 2035/005* (2013.01); *G03G 2221/1657* (2013.01)

(58) Field of Classification Search
CPC ............ G03G 15/1615; G03G 15/757; G03G 15/5008; G03G 15/0136; G03G 21/1647; G03G 2221/1657; G03G 2215/0193; F16H 1/20; F16H 55/17; F16H 1/206; F16H 2035/005; F16H 2035/006
USPC ........................................ 399/167, 302, 308
See application file for complete search history.

(56) References Cited

U.S. PATENT DOCUMENTS

| | | | |
|---|---|---|---|
| 8,428,494 B2* | 4/2013 | Ino .......................... | F16H 27/08 399/222 |
| 9,121,475 B2* | 9/2015 | Kuroda .................... | F16H 27/08 |
| 2016/0209783 A1* | 7/2016 | Chino ................ | G03G 21/1647 |

FOREIGN PATENT DOCUMENTS

| | | | |
|---|---|---|---|
| JP | 06050406 A | * | 2/1994 |
| JP | 07228368 A | * | 8/1995 |
| JP | 08226517 A | * | 9/1996 |
| JP | 2000310311 A | * | 11/2000 |

(Continued)

*Primary Examiner* — Robert Beatty
(74) *Attorney, Agent, or Firm* — Fitzpatrick, Cella, Harper & Scinto

(57) ABSTRACT

The driving force transmission apparatus, in which on at least one of portions of a first rotary member and a second rotary member opposed to each other under a state in which a driving rotary member and a driven rotary member are opposed to each other through a first non-engaging portion, includes a non-contact portion at which the first rotary member and the second rotary member are prevented from being brought into contact with each other is formed, wherein the non-contact portion is configured to cut torque transmitted from a driven member side to the first rotary member side through the second rotary member.

25 Claims, 23 Drawing Sheets

(56) References Cited

FOREIGN PATENT DOCUMENTS

| JP | 2006266399 A | * | 10/2006 |
| JP | 2008164151 A | * | 7/2008 |
| JP | 2015-18040 A | | 1/2015 |
| JP | 2016-24427 A | | 2/2016 |

* cited by examiner

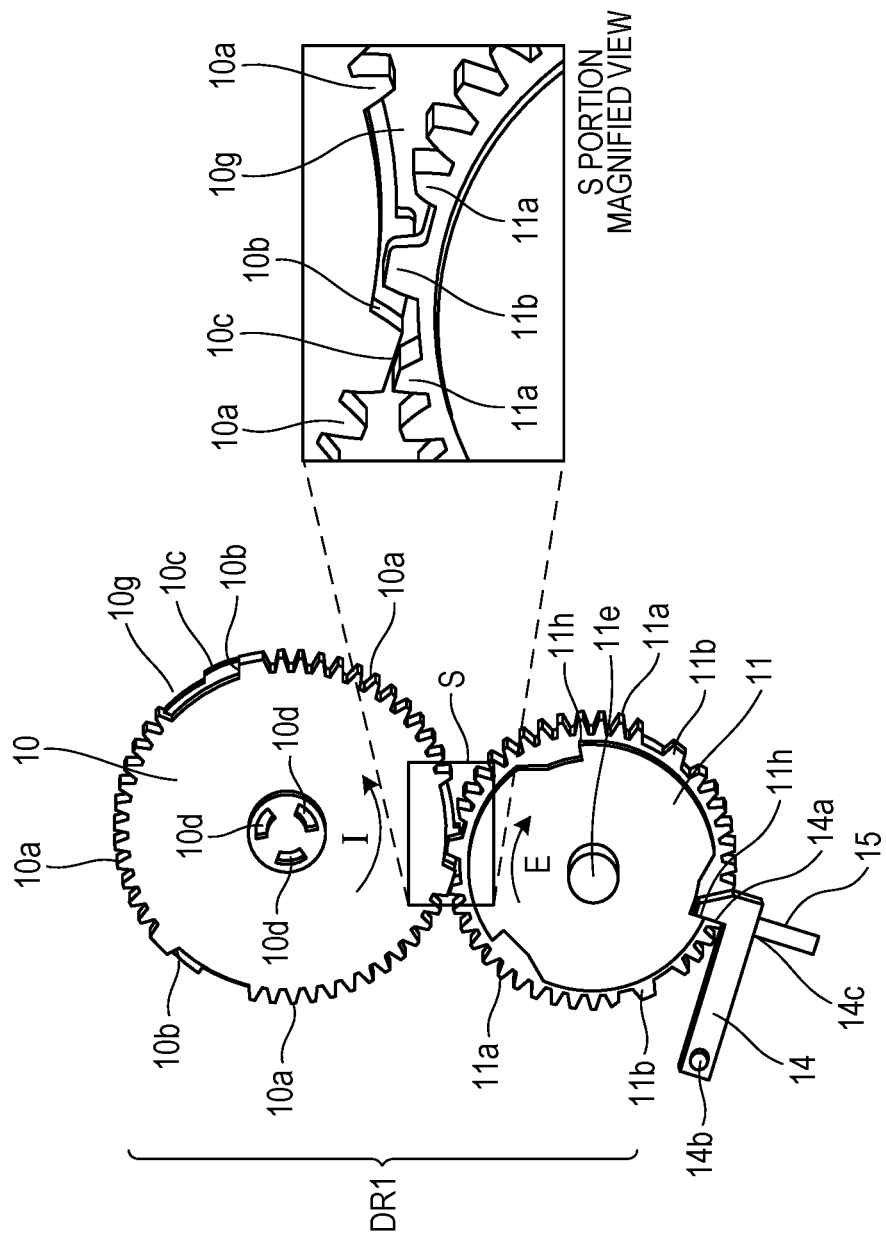

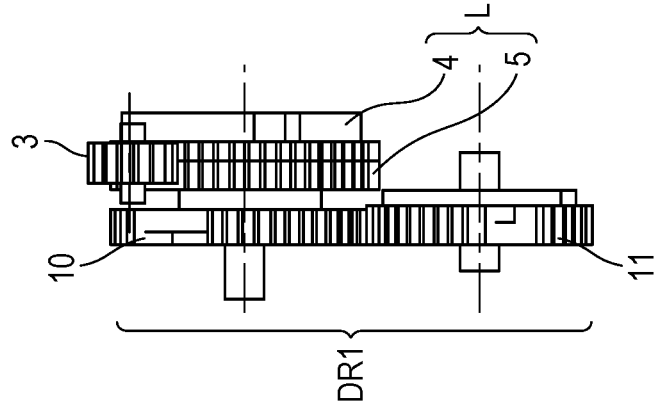
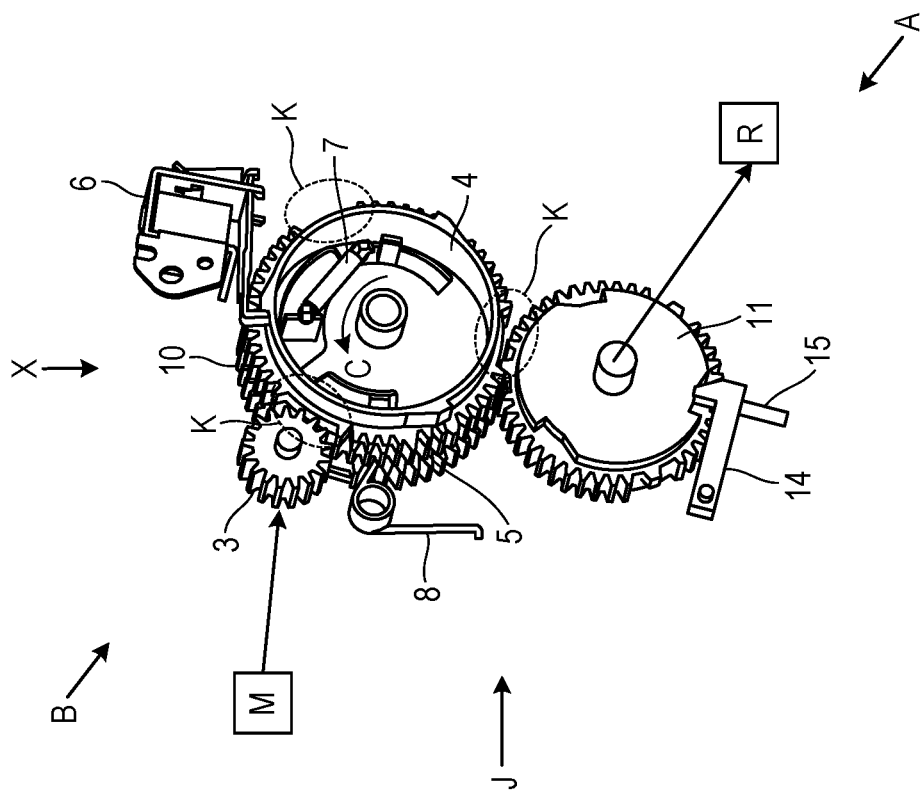

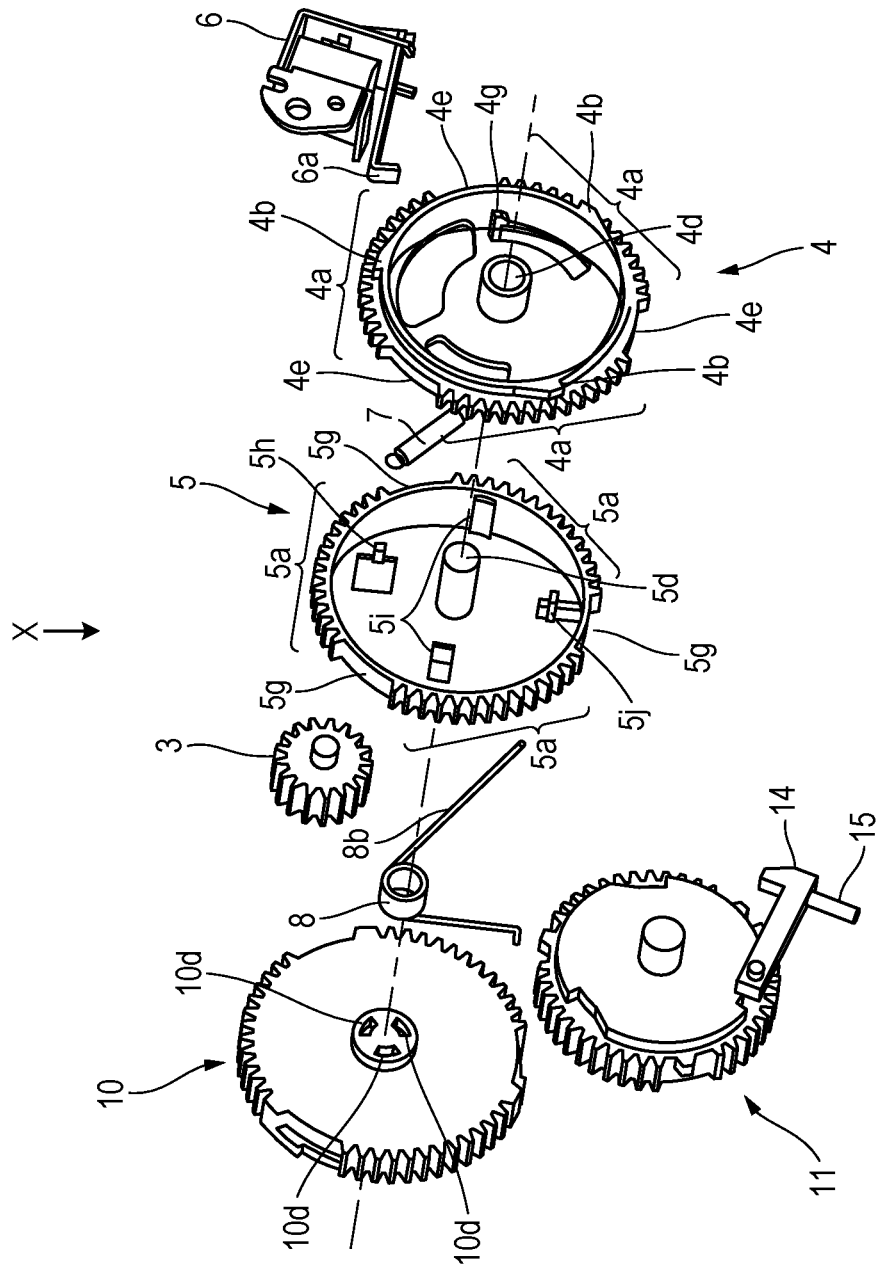

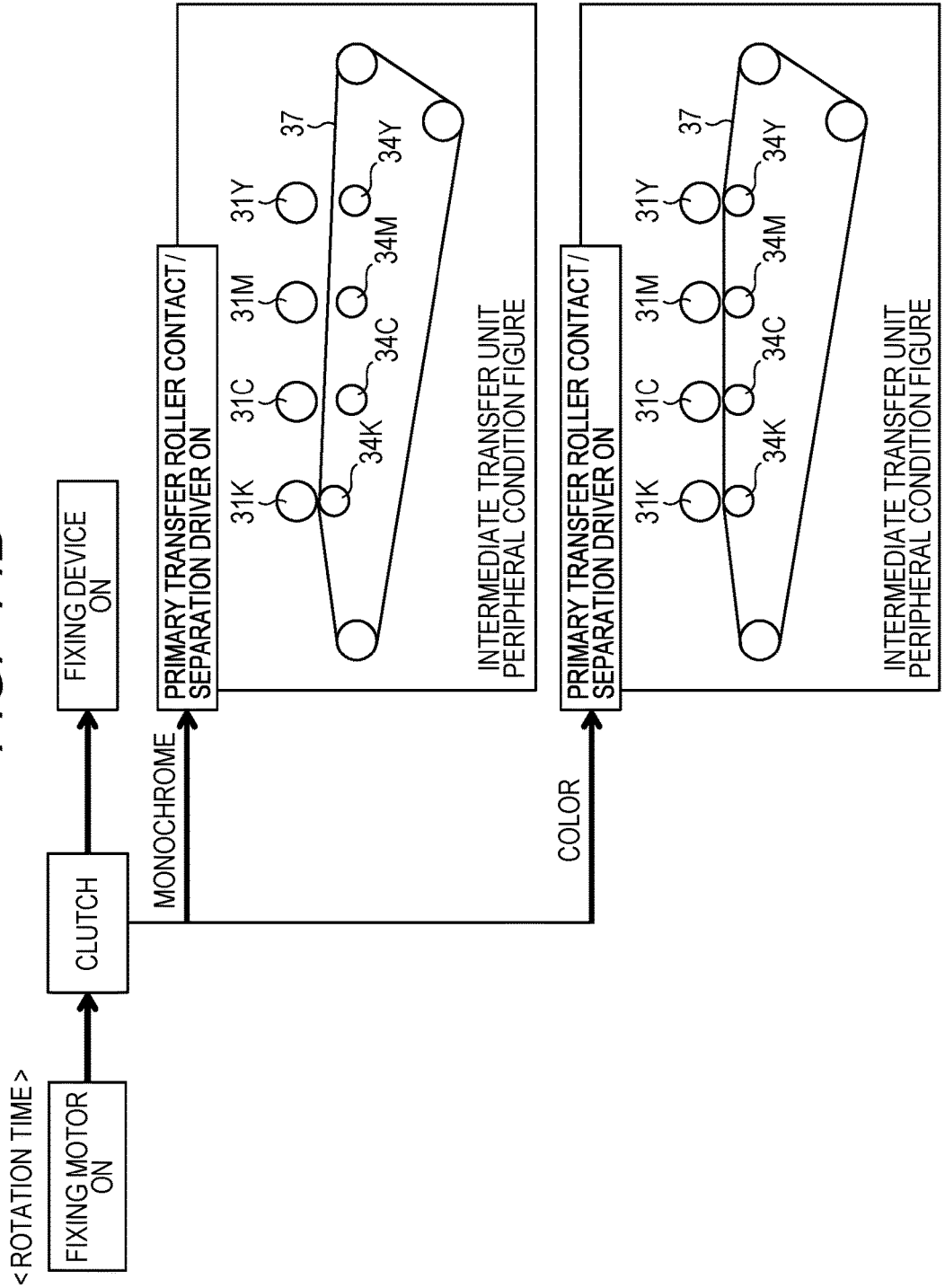

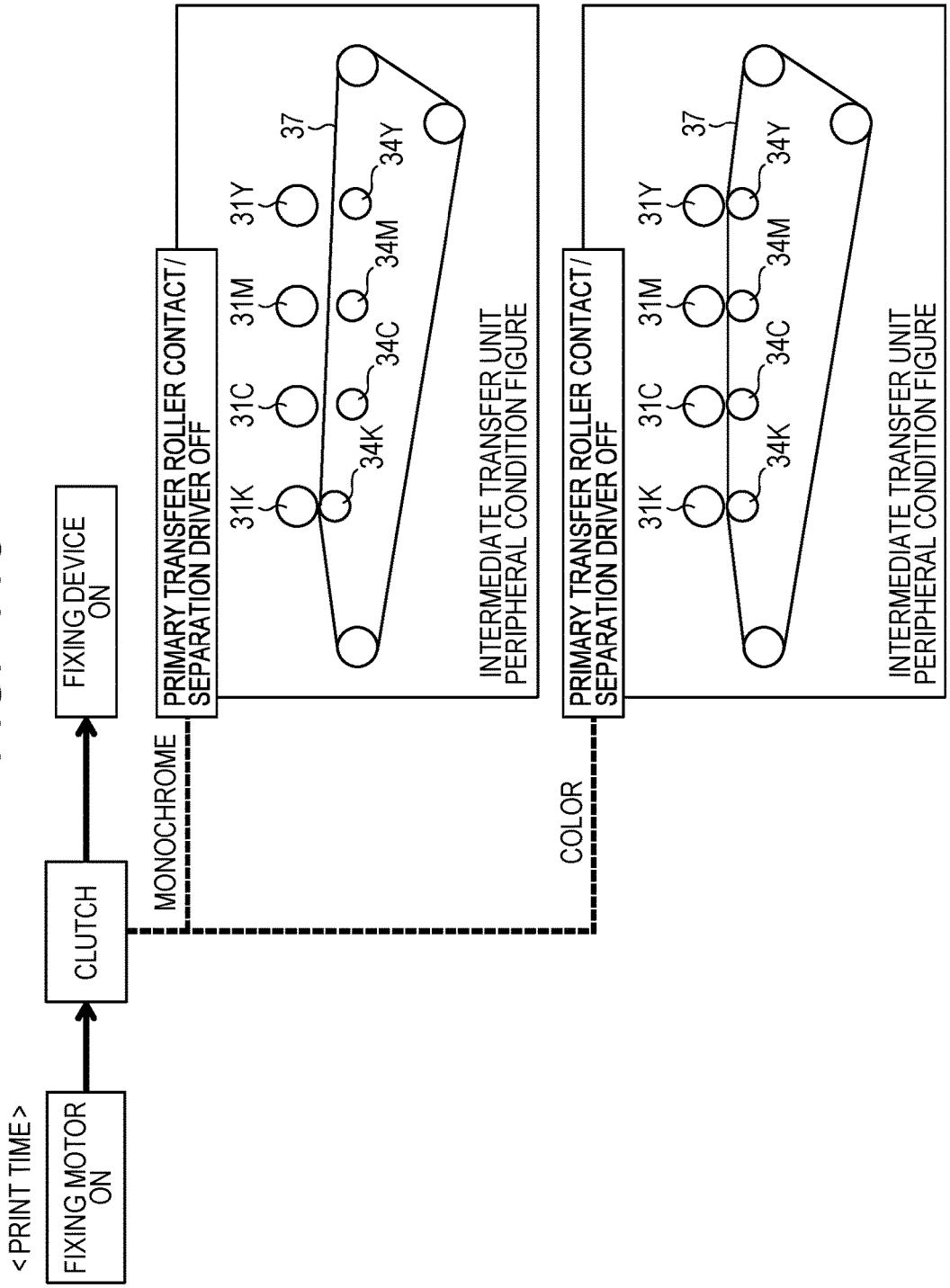

DRIVING FORCE TRANSMISSION APPARATUS AND IMAGE FORMING APPARATUS

BACKGROUND OF THE INVENTION

Field of the Invention

The present invention relates to a driving force transmission apparatus configured to transmit and cut driving force from a driving force source, and an image forming apparatus including the driving force transmission apparatus.

Description of the Related Art

Hitherto, there has been known an image forming apparatus using an electrophotographic technique. In such an image forming apparatus, there are arranged rotary members such as a photosensitive drum, a transfer roller, and a developing roller. Those rotary members are rotated by a driving force source such as a motor. Further, there is a case where an image forming apparatus includes a clutch configured to transmit and cut the driving force from the driving force source.

According to a technology described in Japanese Patent Application Laid-Open No. 2015-18040, an image forming apparatus includes a driving force transmission mechanism configured to transmit driving force from a motor to a driving roller. The driving roller is configured to rotationally move an intermediate transfer belt. Further, the image forming apparatus includes a clutch (clutch B1) configured to transmit and cut driving force from the motor on a driving force transmission path extending from the motor to the driving roller. This clutch includes a first gear (gear 7) configured to be rotated by driving force from the driving force source, and a second gear (gear 8b) configured to be rotated through engagement with the first gear. Further, the clutch includes a third gear (gear 8d), which is arranged coaxially with the second gear and configured to be rotated integrally with the second gear, and a fourth gear (gear 9) configured to be rotated through engagement with the third gear. The fourth gear is connected to a driven member through a transmission mechanism, and driving force of the driving force source is transmitted to the driven member.

Further, the second gear has a toothless portion (portion missing a tooth). When the toothless portion of the second gear is opposed to teeth of the first gear, the first gear and the second gear are prevented from engaging with each other, thereby preventing driving force from being transmitted from the first gear to the second gear. Then, under a state in which the toothless portion of the second gear and the first gear are opposed to each other, a locking member locks the second gear to thereby stop rotation of the second gear. With this, according to the technology described in Japanese Patent Application Laid-Open No. 2015-18040, transmission of driving force from the first gear to the second gear is cut. Further, when the locking member cancels locking with respect to the second gear, the second gear can be engaged with the first gear again. Thus, driving force is transmitted from the first gear to the second gear. In such a manner, driving force from the motor can be transmitted and cut.

According to the technology described in Japanese Patent Application Laid-Open No. 2015-18040, as described above, the clutch includes the third gear arranged coaxially with the second gear. The third gear is connected to the second gear, and hence is rotated integrally with the second gear. Further, the third gear has a convex arc surface, and the fourth gear has a concave arc surface. According to the technology described in Japanese Patent Application Laid-Open No. 2015-18040, the second gear is held so that the toothless portion of the second gear and the first gear are opposed to each other with an elastic force of a spring (torsion spring 11). Further, the elastic force of the spring causes the second gear to rotate by a slight angle so that the second gear and the first gear are engaged with each other again.

At this time, the convex arc surface of the third gear and the concave arc surface of the fourth gear are held in contact with each other, and hence teeth of the third gear and teeth of the fourth gear are prevented from being engaged with each other. Thus, driving force is prevented from being transmitted from the third gear to the fourth gear, and hence the fourth gear is prevented from being rotated. With this, the second gear can be rotated with the elastic force of the spring without rotation of the driven member, thereby being capable of reducing the elastic force of the spring required for rotation of the second gear.

However, according to the technology described in Japanese Patent Application Laid-Open No. 2015-18040, when driving force is transmitted from the fourth gear to the driven member, deformation or torsion may occur in a transmission member (for example, a shaft) configured to transmit the driving force from the fourth gear to the driven member. In a case where the arc surface of the third gear and the arc surface of the fourth gear are held in contact with each other, the teeth of the third gear and the teeth of the fourth gear are prevented from being engaged with each other. Thus, torque which may be generated by torsion in the transmission member may cause the fourth gear to rotate in a reverse direction. With this, a contact pressure between the convex arc surface of the third gear and the concave arc surface of the fourth gear may be increased.

Thus, a larger force may be required in order to rotate the third gear. Therefore, in order to rotate the second gear through the third gear with the elastic force of the spring, the elastic force of the spring needs to be increased. In a case where the torque exerted on the transmission member is large, the related-art spring cannot cause the second gear to rotate.

However, in a case where the elastic force of the spring is to be increased, a material and a shape of the member configured to hold the spring need to be the material and the shape which may offer tolerance against the elastic force of the spring. Therefore, there is a fear in that an image forming apparatus is increased in size, or a fear in that manufacturing cost for the image forming apparatus is increased. Further, the second gear is rotated with a large elastic force, and hence there is a fear in that sound of operation during rotation of the second gear may become larger.

SUMMARY OF THE INVENTION

In view of this, an object of the present invention is to provide a driving force transmission apparatus which is operable while maintaining a proper elastic force of an elastic member.

Another object of the present invention is to provide a driving force transmission apparatus, including a driving rotary member configured to receive driving force transmitted from a driving force source, a driven rotary member configured to rotate through engagement with the driving rotary member, a first rotary member configured to rotate in synchronization with the driven rotary member; and a second rotary member configured to be engaged with the first rotary member to transmit driving force to a driven member, in which at least one of the driving rotary member or the driven rotary member has a first non-engaging portion prevented from engaging with another, in which, under a state in which the driving rotary member and the driven rotary member are opposed to each other through the first non-engaging portion, transmission of driving force from the driving rotary member to the driven rotary member is cut, in which the driving force transmission apparatus further includes a first elastic member configured to hold the driven rotary member with an elastic force at a predetermined position at which the driving rotary member and the driven rotary member are opposed to each other through the first non-engaging portion, and in which on at least one of portions of the first rotary member and the second rotary member opposed to each other under the state in which the driving rotary member and the driven rotary member are opposed to each other through the first non-engaging portion, a non-contact portion at which the first rotary member and the second rotary member are prevented from being brought into contact with each other is formed, and the non-contact portion is configured to cut torque transmitted from the driven member side to the first rotary member side through the second rotary member.

A further object of the present invention is to provide a driving force transmission apparatus, including, a driving rotary member configured to receive driving force transmitted from a driving force source, a driven rotary member configured to rotate through engagement with the driving rotary member, a first rotary member configured to rotate in synchronization with the driven rotary member; and a second rotary member configured to rotate through engagement with the first rotary member to transmit driving force to a driven member, in which at least one of the driving rotary member or the driven rotary member has a first non-engaging portion prevented from engaging with another, and under a state in which the driving rotary member and the driven rotary member are opposed to each other through the first non-engaging portion, transmission of driving force from the driving rotary member to the driven rotary member is cut, and in which the driving force transmission apparatus further includes a first elastic member configured to hold the driven rotary member with an elastic force under the state in which the driving rotary member and the driven rotary member are opposed to each other through the first non-engaging portion, and a reverse preventing mechanism configured to prevent rotation of the second rotary member in a direction reverse to a direction of rotation of the second rotary member with transmission of driving force from the driving rotary member under the state in which the driving rotary member and the driven rotary member are opposed to each other through the first non-engaging portion.

Further features of the present invention will become apparent from the following description of exemplary embodiments with reference to the attached drawings.

BRIEF DESCRIPTION OF THE DRAWINGS

FIG. 1 is a perspective view of a clutch according to a first embodiment of the present invention.

FIG. 2A and FIG. 2B are views of the clutch according to the first embodiment.

FIG. 3 is an exploded perspective view of a clutch mechanism according to the first embodiment.

FIG. 14B is a view for illustrating a state in which driving force from the fixing motor is transmitted at the rotation time.

FIG. 14C is a view for illustrating a state in which driving force from the fixing motor is transmitted to the fixing device.

DESCRIPTION OF THE EMBODIMENTS

Embodiments of the present invention are described below with reference to the attached drawings. Dimensions, materials, and shapes of components described in the embodiments, a relative arrangement thereof, and other such factors may be appropriately changed depending on structures of apparatus to which the present invention is applied or various conditions, and are not intended to limit the scope of the present invention to the following embodiments.

First Embodiment

Figure 13:
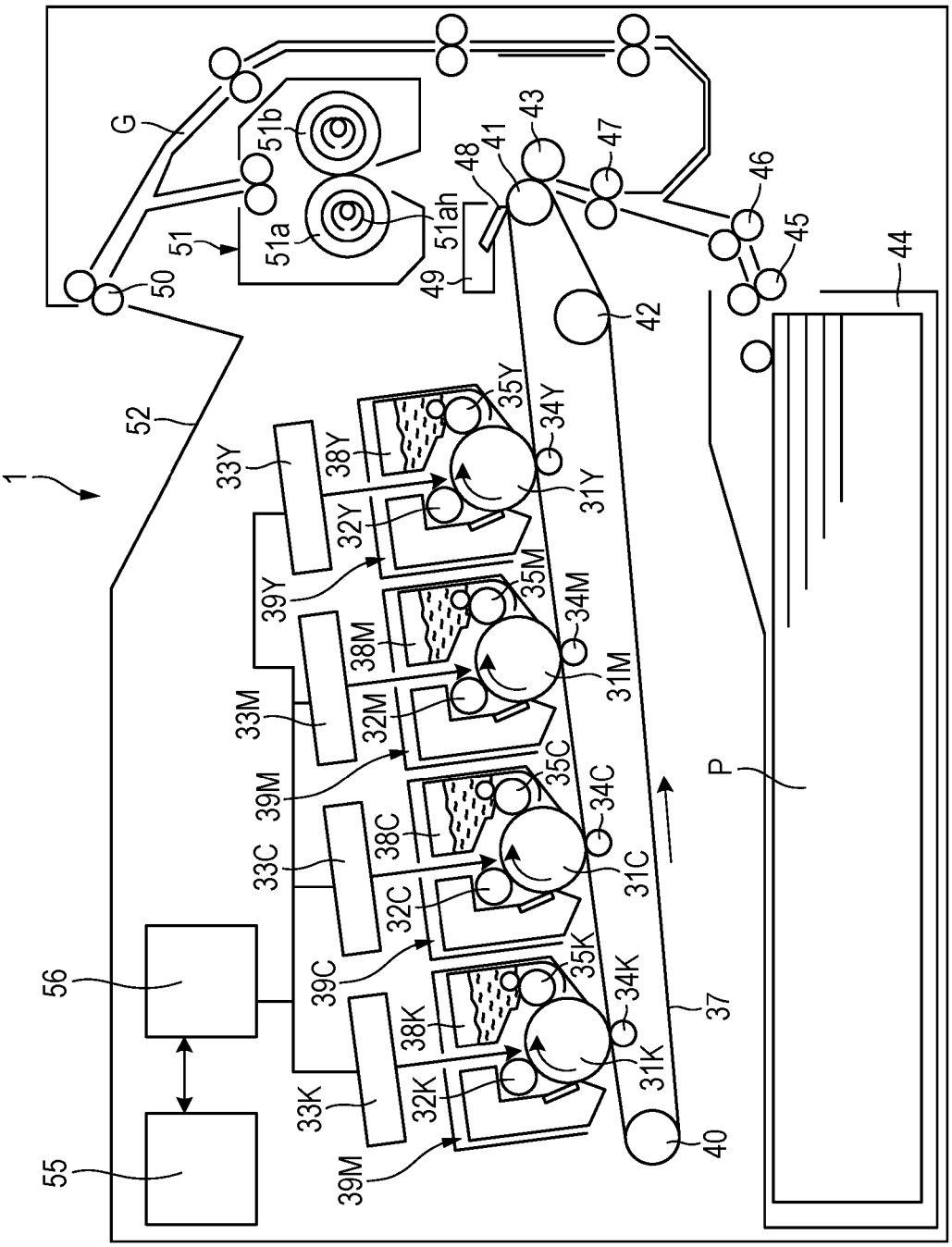
FIG. 13 is a schematic sectional view of an image forming apparatus according to the first embodiment.

First, a schematic configuration of a laser beam printer (LBP) as an image forming apparatus 1 is described with reference to FIG. 13. FIG. 13 is a schematic sectional view of the image forming apparatus 1 according to a first embodiment of the present invention. First, an image forming portion is described. The image forming portion includes, in stations for respective colors C, M, Y, and K, photosensitive drums 31Y, 31M, 31C, and 31K serving as image bearing members, charging rollers 32Y, 32M, 32C, and 32K serving as primary charging units, and light exposure scanner portions 33Y, 33M, 33C, and 33K. Further, the image forming portion includes developing devices 38Y to 38K serving as developing units, an intermediate transfer belt 37 serving as a transferred member, a driving roller 41 configured to drive the intermediate transfer belt 37, and a tension roller 40. Further, the image forming portion includes an assist roller 42 and primary transfer rollers 34Y to 34K serving as transfer members.

Further, the image forming portion includes a secondary transfer roller 43, a fixing device 51, an imaging controller 56 configured to control operations of process units arranged in the image forming portion, and a main body controller 55. The photosensitive drums 31Y to 31K are each formed by applying an organic photoconductive layer onto an outer circumference of an aluminum cylinder and rotated by receiving transmission of driving force of a driving motor (not shown). The driving motor rotates the photosensitive drums 31Y to 31K in a clockwise direction in accordance with an image forming operation.

Next, operations of the image forming apparatus 1 are described. When the above-mentioned main body controller 55 receives an image signal, a recording material P serving as a recording medium is sent out from a sheet feeding cassette 44 by a sheet feeding roller 45 and a sheet feeding roller 46. Then, the recording material P is temporarily nipped and stopped by a registration roller pair 47 in order to synchronize conveyance of the recording material P with the image forming operation. Meanwhile, the imaging controller 56 controls the light exposure scanner portions 33Y to 33K in accordance with the received image signal, to thereby form electrostatic latent images on respective surfaces of the photosensitive drums 31Y to 31K which are charged to a certain electric potential by the effect of the charging rollers 32Y to 32K.

The developing devices 38Y to 38K are units configured to form the electrostatic latent images into visible images, and develop the electrostatic latent images into toner images as developer images of yellow (Y), magenta (M), cyan (C), and black (K) for respective stations. The developing devices 38Y to 38K include sleeves 35Y to 35K, respectively. A developing bias for forming the electrostatic images into visible images is applied to the sleeves 35Y to 35K. As described above, the electrostatic latent images formed on the respective surfaces of the photosensitive drums 31Y to 31K are developed as single-color toner images by the effect of the developing devices 38Y to 38K. The photosensitive drum 31, the charging roller 32, and the developing device 38 are integrally constructed as a toner cartridge 39. The toner cartridge 39 is removably mounted to the apparatus main body of the image forming apparatus 1.

The intermediate transfer belt 37 is held in contact with the photosensitive drums 31Y to 31K, and is rotated in a counter-clockwise direction of FIG. 13 in synchronization with rotation of the photosensitive drums 31Y to 31K during color image formation. The developed single-color toner images are sequentially transferred onto the intermediate transfer belt 37 by the effect of the primary transfer bias applied to the primary transfer rollers 34. Multi-color toner images are transferred onto the intermediate transfer belt 37 in superposition with each other.

After that, the multi-color toner images formed on the intermediate transfer belt 37 are conveyed to a secondary transfer nip portion formed between the driving roller 41 and the secondary transfer roller 43. At the same time, the recording material P held under a state of being nipped by the registration roller pair 47 is conveyed by the registration roller pair 47 to the secondary transfer nip portion in synchronization with the multi-color toner images on the intermediate transfer belt. Then, the multi-color toner images on the intermediate transfer belt 37 are collectively transferred by the effect of the secondary transfer bias applied to the secondary transfer roller 43.

The fixing device 51 is configured to melt and fix the transferred multi-color toner images while conveying the recording material P. The fixing device 51 includes a fixing roller 51a configured to heat the recording material P and a pressure roller 51b configured to bring the recording material P into press-contact with the fixing roller 51a. The fixing roller 51a and the pressure roller 51b are each formed into a hollow shape. In the fixing roller 51a, there is arranged a heater 51ah. The recording material P having the multi-color toner images transferred thereon is conveyed and also heated and pressurized by the fixing roller 51a and the pressure roller 51b. With this, the toner images are fixed onto a surface of the recording material.

The recording material P having the toner images fixed thereon is delivered to a sheet delivery tray 52 by a sheet delivery roller 50. Alternatively, for image formation on a second surface, the recording material P passes through a both-side printing conveyance path G by a switch-back operation at a sheet delivery portion and is nipped again by the conveyance roller pair (registration roller pair) 47. After that, an image is formed on the second surface of the recording material P by the series of image forming operations described above, and the recording material P is delivered to the sheet delivery tray 52 by the sheet delivery roller 50.

A cleaning unit 48 is configured to collect toner, which serves as a developer and remains on the intermediate transfer belt 37, to clean the intermediate transfer belt 37. The transfer residual toner collected by the cleaning unit 48 is stored as waste toner in a cleaner container 49. In the description above, the operations during color printing are described. During monochromatic printing, the primary transfer rollers 34Y, 34M, and 34C, arranged on an inner side of the intermediate transfer belt 37, are moved in a direction to separate from the photosensitive drums 31Y, 31M, and 31C. With this, the intermediate transfer belt 37 is not brought into contact with the photosensitive drums 31Y, 31M, and 31C. This separation and lack of contact prevents degradating the service life of the photosensitive drums 31Y, 31M, and 31C by preventing loading of the photosensitive drums 31Y, 31M, and 31C which are not used. In order to prevent sliding contact between the stopped photosensitive drums 31 and the intermediate transfer belt 37, as described above, the primary transfer rollers which are not used need to be separated from the photosensitive drums 31.

Further, after printing is terminated, all of the primary transfer rollers 34 need to be separated from the photosensitive drums 31. This is for the purpose of preventing the photosensitive drums 31 from being in slide contact with the intermediate transfer belt 37 when installing and removing the toner cartridges 39. Further, the motors configured to cause the primary transfer rollers 34 to approach to and separate from the photosensitive drums 31 are often shared with a motor configured to drive another unit to reduce cost and size of the image forming apparatus 1. In this embodiment, driving force for causing the primary transfer rollers 34 to approach to and separate from the photosensitive drums 31 is supplied from a motor (not shown) configured to drive the fixing device (fixing motor). In that case, driving force from the fixing motor needs to be transmitted and cut with respect to the mechanism configured to cause the primary transfer rollers 34 to approach to and separate from the photosensitive drums 31 in accordance with operating the image forming apparatus 1 as discussed above.

Figure 14A:
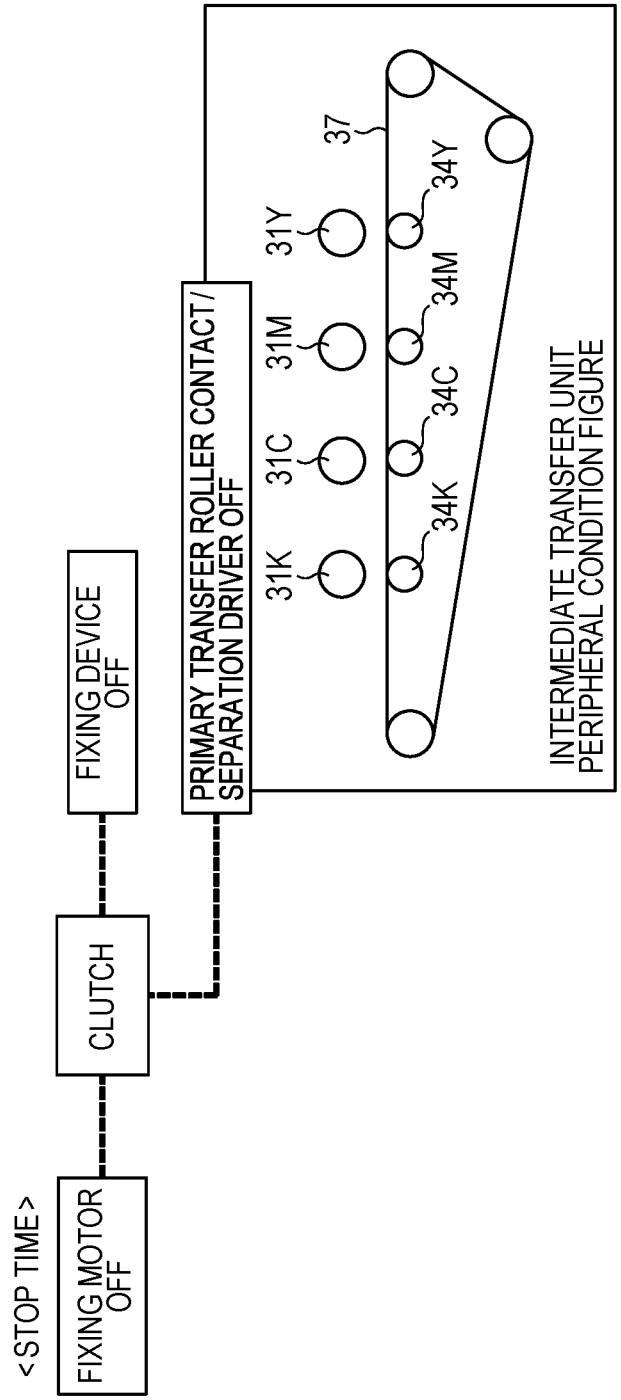
FIG. 14A is a view for illustrating a state in which the fixing motor is turned off.

FIG. 14A to FIG. 14D are views for illustrating states in which driving force from the fixing motor is transmitted to a contact and separation mechanism for the primary transfer rollers 34 and to the fixing device 51 in accordance with operating the image forming apparatus 1, as discussed above. Between the contact and separation mechanism for the primary transfer rollers 34, which is an output destination, and the fixing motor, which is an input source, and between the fixing device 51, which is also an output destination, and the fixing motor there is arranged a clutch X configured to switch transmission of driving force. In FIG. 14A, the image forming apparatus 1 is stopped, and the fixing motor is stopped. Further, the fixing device 51 is stopped, and all of the four primary transfer rollers 34 are separated from the photosensitive drums 31.

In FIG. 14B, the image forming apparatus 1 is under a state in which preliminary rotation before printing is performed. When the fixing motor is turned on, driving force is transmitted to the fixing device 51 through the clutch X. Further, when monochromatic printing is performed, driving force is transmitted to the contact and separation mechanism for the primary transfer rollers 34 through the clutch X, and only the primary transfer roller 34K is brought into contact with the photosensitive drum 31K. Meanwhile, when color printing is to be performed, driving force is transmitted to the contact and separation mechanism for the primary transfer rollers 34 through the clutch X, and all of the primary transfer rollers 34K to 34Y are brought into contact with all of the photosensitive drums 31K to 31Y, respectively.

FIG. 14C is a view for illustrating a state in which printing is performed by the image forming apparatus 1. During printing, a positional relationship between the primary transfer rollers 34 and the photosensitive drums 31 needs to be maintained. Thus, driving force needs to be transmitted to the fixing device 51, and driving force needs to be cut with respect to the contact and separation mechanism for the primary transfer rollers 34. As illustrated in FIG. 14C, during monochromatic printing, when the fixing motor is turned on, driving force of the fixing motor is transmitted to the fixing device 51 through the clutch X. Meanwhile, transmission of driving force to the contact and separation mechanism for the primary transfer rollers 34 is cut by the clutch X, and the state of the preliminary rotation described with reference to FIG. 14B is maintained. This holds true for the color printing, and the state of preliminary rotation is maintained.

Figure 14D:
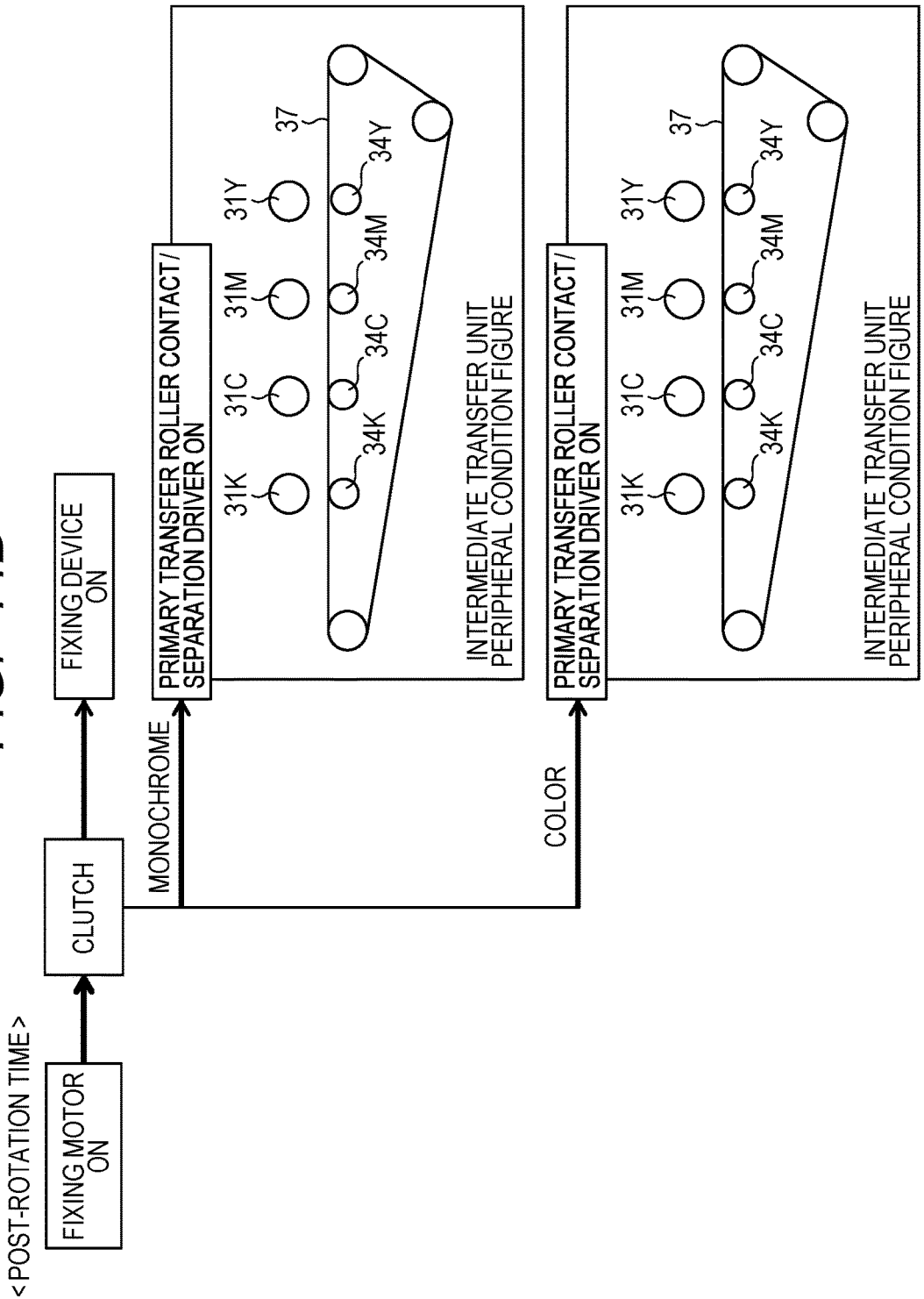
FIG. 14D is a view for illustrating a state in which driving force from the fixing motor is transmitted at the post-rotation.

Further, when the monochromatic printing and color printing are both terminated, as illustrated in FIG. 14D, driving force from the fixing motor is transmitted to the fixing device 51 and the contact and separation mechanism for the primary transfer rollers 34 through the clutch X. All of the primary transfer rollers 34K to 34Y are separated from all of the photosensitive drums 31K to 31Y, respectively. The state of the primary transfer rollers 34 at this time is the same as the state of being stopped as illustrated in FIG. 14A. As described above, in a case where a motor is shared for transmission of driving force to a plurality of output destinations, transmitting and cutting of the driving force need to be switched in accordance with the operation of the image forming apparatus 1. Thus, the clutch X needs to be arranged in the image forming apparatus. As the contact and separation mechanism for the primary transfer roller 34, it is conceivable to employ, for example, a mechanism configured to rotate a cam with driving force transmitted from the driving force source to bring the primary transfer roller 34 into contact with the photosensitive drum 31 or to separate them.

Now, description is made of the clutch X configured to switch between transmitting and cutting a driving force with respect to the above-mentioned contact and separation mechanism (hereinafter referred to as "driven member R") for the primary transfer rollers 34. First, description is made with reference to FIG. 1 to FIG. 5C of the clutch X, which includes a gear pair DR1 having an intermittent portion and is configured to switch between transmitting and cutting the driving force from a driving force source M with respect to the driven member R. FIG. 1 is a perspective view of the clutch X according to the first embodiment. Further, FIG. 2A is also a perspective view of the clutch X according to the first embodiment. FIG. 2B is a view for illustrating the clutch X as viewed from the direction J of FIG. 2A. FIG. 3 is an exploded perspective view of a clutch mechanism according to the first embodiment.

In the clutch X according to this embodiment, driving force is transmitted through the driving force source M, a driving gear 3, a trigger gear 4, a driven gear 5, an intermittent input gear 10, an intermittent output gear 11, and the driven member R in the stated order. The trigger gear 4 serving as a trigger rotary member and the driven gear 5 serving as a driven rotary member construct a double toothless clutch L, and both of the gears have three toothless portions at the portions K of FIG. 2A so as to transmit and cut driving force from the driving gear 3 serving as a driving rotary member. Further, when the toothless portion is opposed to the driving gear 3, transmission of driving force with respect to the trigger gear 4 and the driven gear 5 is cut.

As illustrated in FIG. 3, the trigger gear 4 has trigger gear portions 4a configured to be engaged with the driving gear 3, and locking portions 4b configured to be locked by a locking claw 6a of a solenoid 6 serving as a rotation regulation member to regulate rotation of the trigger gear 4. Further, the trigger gear 4 has a hooking claw 4g to which a trigger spring 7 serving as a second elastic member is hooked. Further, the trigger gear 4 has a bearing portion 4d and a trigger driving portion 4h (see FIG. 5C) configured to transmit driving force to the driven gear 5. At some parts of the trigger gear portion 4a, there are formed trigger toothless portions 4e which prevent engagement with the driving gear 3. The trigger toothless portions 4e are formed so as to correspond to driven toothless portions 5g of the driven gear 5. Further, the bearing portion 4d is rotatably supported by a rotary shaft 5d of the driven gear 5.

As illustrated in FIG. 3, the driven gear 5 has driven gear portions 5a configured to be engaged with the driving gear 3, cam portions 5b (see FIG. 4B) with which a torsion spring 8 serving as a first elastic member is brought into contact, and a hooking claw 5h to which the trigger spring 7 is hooked. Further, the driven gear 5 has the rotary shaft 5d, connection projections 5e (see FIG. 4B), and claws 5i (at two locations) configured to prevent removal of the driven gear 5 in a rotary axis direction. Further, the driven gear 5 has a triggered driving portion 5j (see FIG. 5C) configured to be engaged with the trigger driving portion 4h of the trigger gear 4 to receive driving force from the trigger gear 4. At some parts of the driven gear portions 5a, there are formed driven toothless portions 5g serving as first non-engaging portions which prevent engagement with the driving gear 3, and the driven toothless portions 5g are formed with the same phase as those of the trigger toothless portions 4e of the trigger gear 4.

Figure 5A:
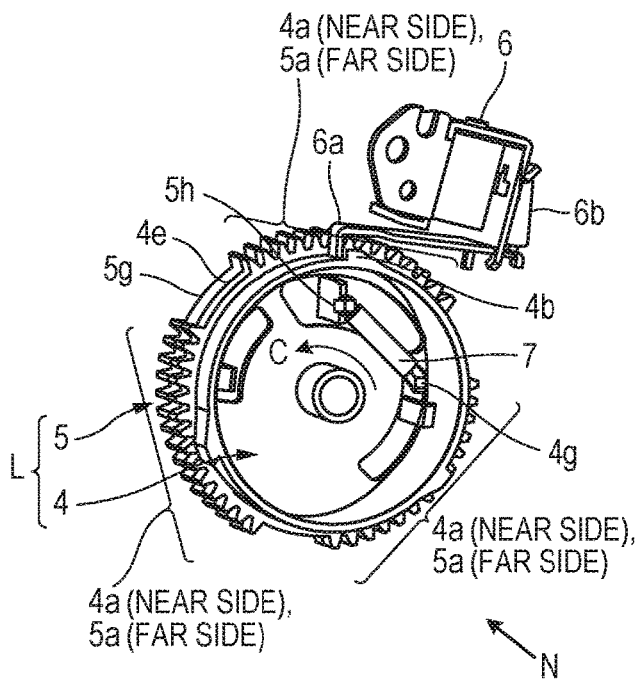
FIG. 5A, FIG. 5B, and FIG. 5C are views for illustrating a positional relationship among the trigger gear, the driven gear, and a solenoid.
Figure 5B:
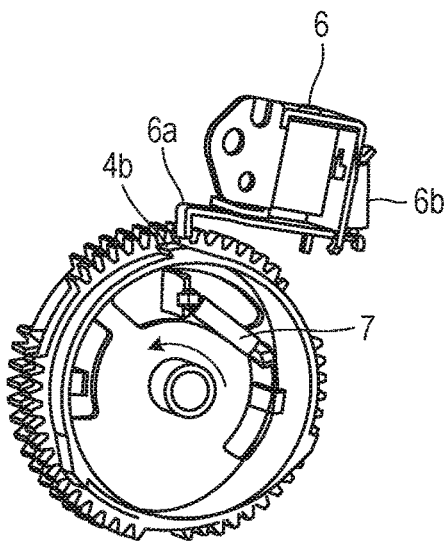
Figure 5C:
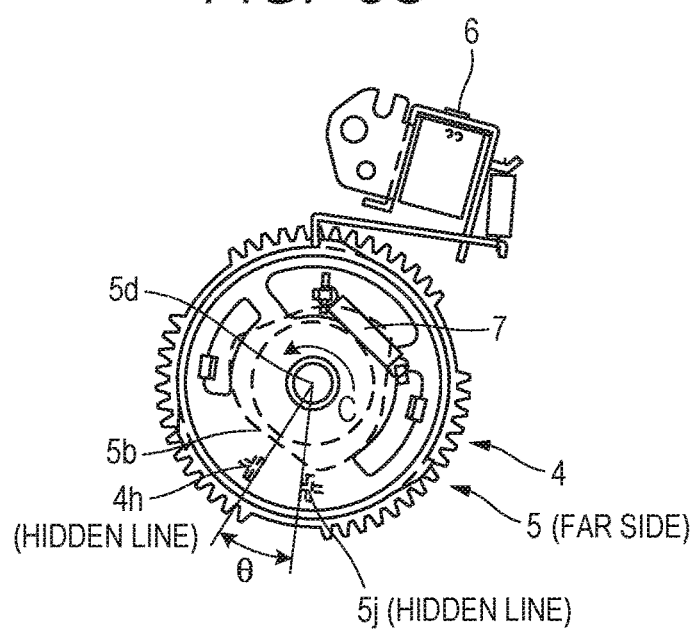

As illustrated in FIG. 5C, there is play of an angle θ between the trigger driving portion 4h of the trigger gear 4 and the triggered driving portion 5j of the driven gear 5. The trigger gear 4 can be rotated by the amount of play about the rotary shaft 5d with respect to the driven gear 5. The amount of this angle θ is substantially equal to a size of four teeth by which the trigger toothless portion 4e and the driven toothless portion 5g are formed. FIG. 5C is a front view as viewed from a direction of the arrow N of FIG. 5A. In FIG. 5C, the dotted lines indicate hidden lines.

FIG. 5A and FIG. 5B are perspective views for illustrating a positional relationship between the double toothless clutch L (trigger gear 4 and driven gear 5) and the solenoid 6 as viewed from the same direction as in FIG. 2A. FIG. 5A is a view for illustrating a state in which the locking portion 4b of the trigger gear 4 is locked. Further, FIG. 5B is a view for illustrating a state in which locking of the locking portion 4b of the trigger gear 4 is cancelled. The solenoid 6 includes a locking claw 6a and a return spring 6b. The return spring 6b urges the locking claw 6a in a direction toward the trigger gear 4. Further, when the locking portion 4b of the trigger gear 4 is at a position opposed to the locking claw 6a, the locking claw 6a can lock the locking portion 4b to regulate rotation of the trigger gear 4.

As illustrated in FIG. 5B, when a current is applied to the solenoid 6, the locking claw 6a retreats from the trigger gear 4 against the urging force of the return spring 6b, and cancels locking of the locking portion 4b of the trigger gear 4 by the locking claw 6a. The trigger gear 4 receives the elastic force of the trigger spring 7 to rotate in a rotation direction of the arrow C with respect to the driven gear 5. As described above, the trigger gear 4 is rotated in a direction of the arrow C only by the angle θ of play between the trigger driving portion 4h of the trigger gear 4 and the triggered driving portion 5j of the driven gear 5 illustrated in FIG. 5C. At this time, rotation of the driven gear 5 is regulated by pressing on the cam portion 5b illustrated in FIG. 5C by a movable arm 8b (see FIG. 7B) of the torsion spring 8. That is, the driven gear 5 is held at a predetermined position by an elastic force of the spring 8.

Figure 4A:
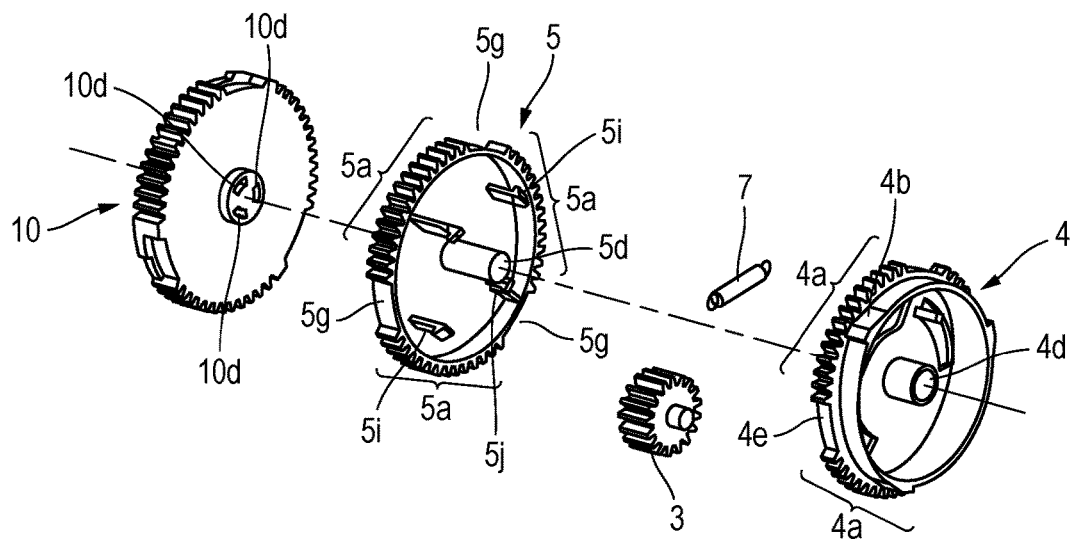
FIG. 4A and FIG. 4B are perspective views for illustrating a driving gear, a trigger gear, a driven gear, and an intermittent input gear.
Figure 4B:
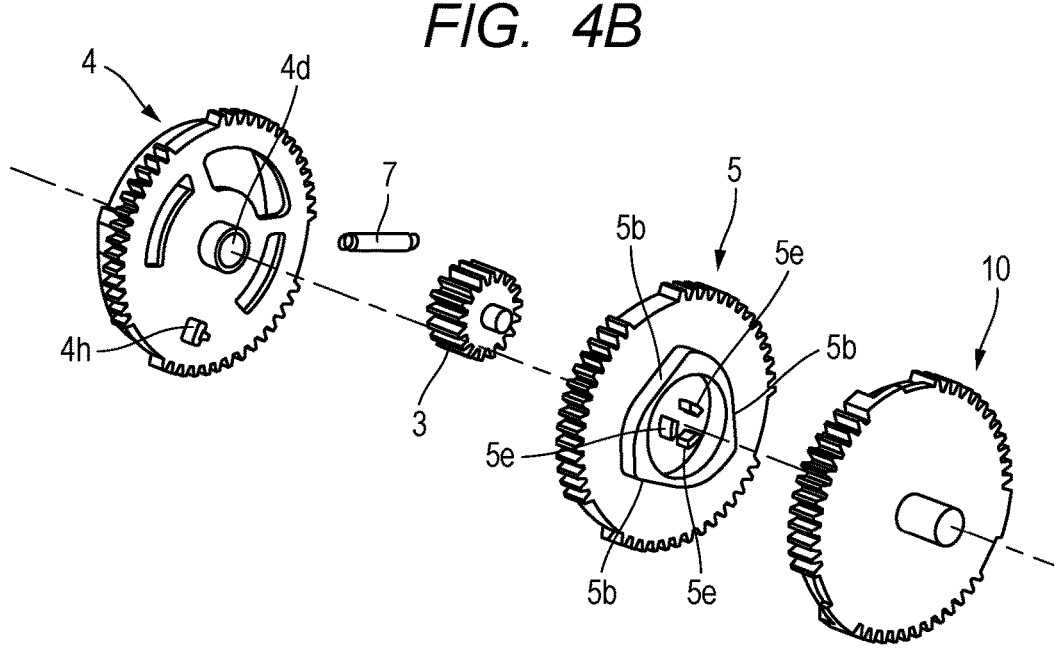

Next, the gear pair DR1 on an output side where driving force from the double toothless clutch L is transmitted is described. As illustrated in FIG. 1, the gear pair DR1 includes an intermittent input gear (first rotary member) 10 and an intermittent output gear (second rotary member) 11. As illustrated in FIG. 2B, the intermittent input gear 10 is arranged coaxially with the double toothless clutch L (trigger gear 4 and driven gear 5). Driving force from the above-mentioned double toothless clutch L is transmitted through engagement between the connection projections 5e of the driven gear 5 and connection recesses 10d of the intermittent input gear 10 illustrated in FIG. 4A and FIG. 4B. FIG. 4A and FIG. 4B are perspective views for separately illustrating the driving gear 3, the trigger gear 4, the driven gear 5, and the intermittent input gear 10. FIG. 4A is a view as viewed from the direction A of FIG. 2A. FIG. 4B is a view as viewed from the direction B of FIG. 2A.

Next, a mechanism of transmission of driving force from the driving gear 3 to the intermittent output gear 11 is described with reference to FIG. 7A to FIG. 12C. FIG. 7A, FIG. 8A, FIG. 9A, FIG. 10A, FIG. 11A, and FIG. 12A are views of the positional relationship among the driving gear 3, the trigger gear 4, the driven gear 5, the solenoid 6, and the torsion spring 8 as viewed from the direction A of FIG. 2A. FIG. 7B, FIG. 8B, FIG. 9B, FIG. 10B, FIG. 11B, and FIG. 12B are views of the positional relationship among the driving gear 3, the trigger gear 4, the driven gear 5, the solenoid 6, and the torsion spring 8 as viewed from the direction B of FIG. 2A. Further, FIG. 7C, FIG. 8C, FIG. 9C, FIG. 10C, FIG. 11C, and FIG. 12C are views of a positional relationship among the intermittent input gear 10, the intermittent output gear 11, and a reverse preventing lever 14 serving as a reverse preventing member.

Figure 7A:
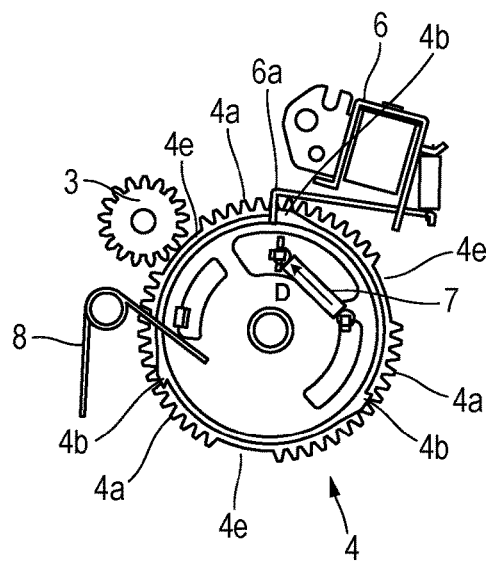
FIG. 7A, FIG. 7B, and FIG. 7C are views for illustrating the clutch at a home position.
Figure 7B:
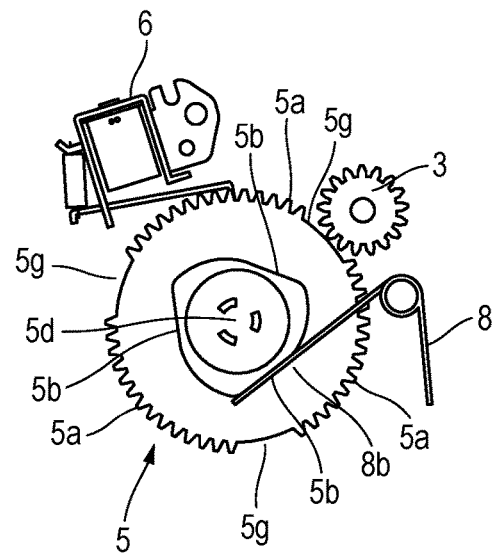
Figure 7C:
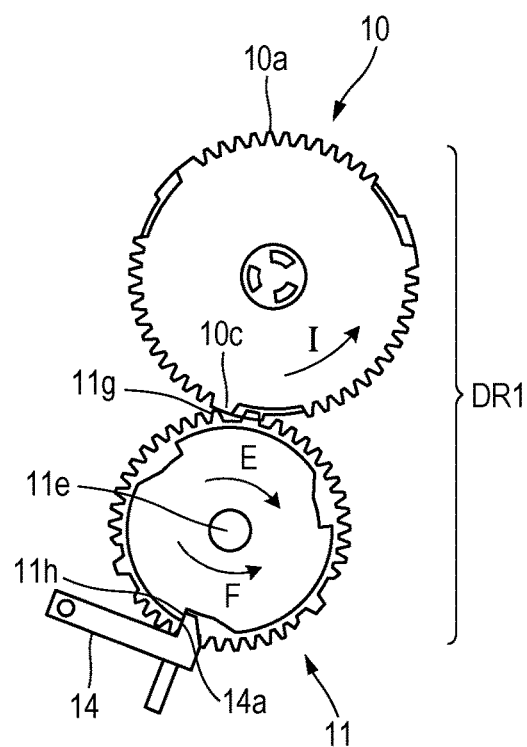

FIG. 7A to FIG. 7C are views for illustrating a state in which the clutch X is at a home position. As illustrated in FIG. 7B, a position of the driven gear 5 is held with the cam portion 5b being pressed toward a center direction of the rotary shaft 5d by the movable arm 8b of the torsion spring 8. As illustrated in FIG. 7A, a position of the trigger gear 4 is held with the locking portion 4b locked by the locking claw 6a of the solenoid 6.

At this time, the trigger gear portions 4a of the trigger gear 4 and the driven gear portions 5a of the driven gear 5 are stopped at the same phase. The trigger toothless portions 4e and the driven toothless portions 5g are at the same phase, and the trigger toothless portions 4e and the driven toothless portions 5g are opposed to the driving gear 3. Thus, driving force of the driving gear 3 is prevented from being transmitted to the trigger gear 4 and the driven gear 5. In the state of FIG. 7C, driving force is prevented from being transmitted to the driven gear 5 as described above. Thus, the intermittent input gear 10 and the intermittent output gear 11 are stopped at the respective home positions, and driving force is prevented from being transmitted to the driven member R (not shown).

Figure 8A:
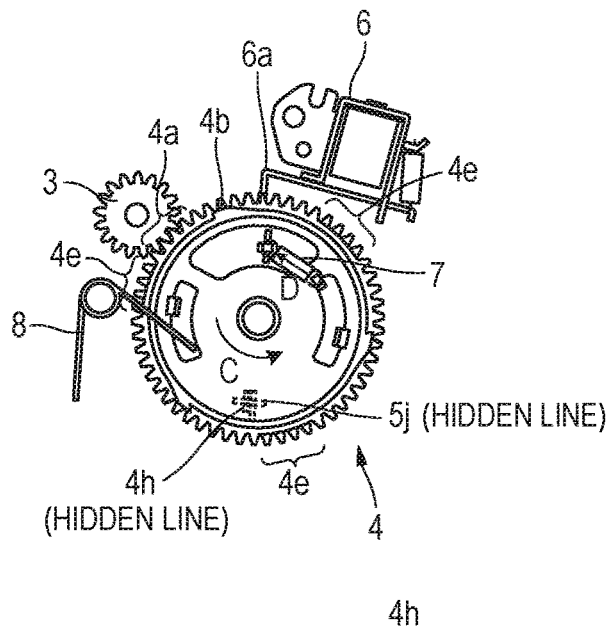
FIG. 8A, FIG. 8B, and FIG. 8C are views for illustrating a state in which transmission of driving force from the driving gear to the trigger gear is started.
Figure 8B:
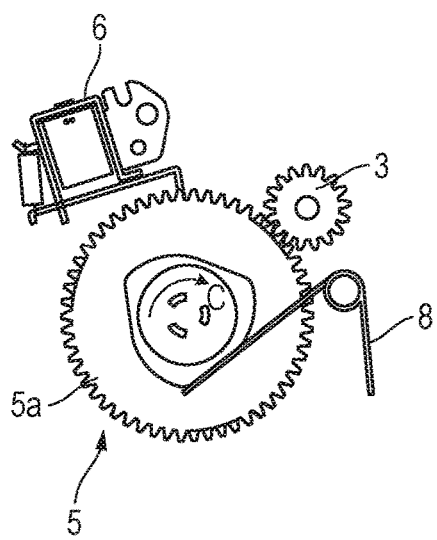
Figure 8C:
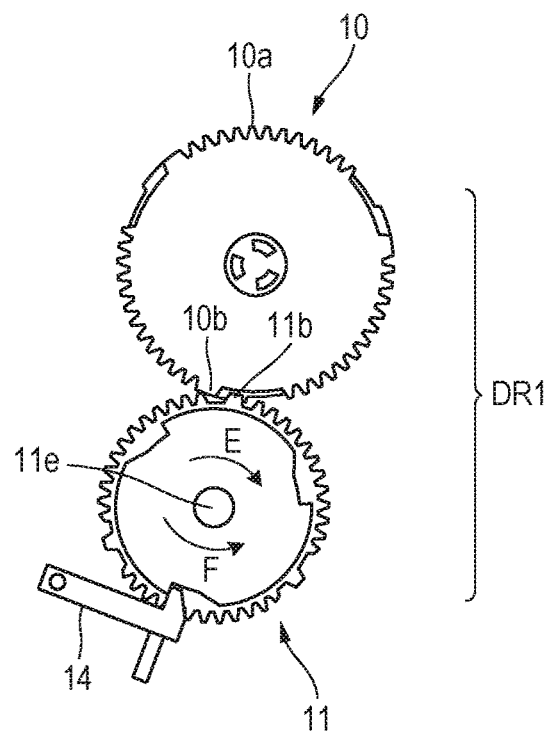

FIG. 8A to FIG. 8C are views for illustrating a state in which a current is applied to the solenoid 6 to cancel locking of the locking claw 6a, to thereby start transmission of driving force to the trigger gear 4. As illustrated in FIG. 8A, when the locking by the locking claw 6a of the solenoid 6 is cancelled, the trigger gear 4 receives a force from the trigger spring 7 in the direction of the arrow D to start rotation in the direction C. At this time, the driven gear 5 is regulated by a pressing force of the torsion spring 8 illustrated in FIG. 8A. Thus, the driven gear 5 is stopped. After that, the trigger gear 4 is rotated by the size of the trigger toothless portion 4e of the trigger gear 4, and hence the trigger driving portion 4h illustrated in FIG. 8A is brought into contact with the triggered driving portion 5j of the driven gear 5, thereby transmitting driving force from the trigger gear 4 to the driven gear 5.

As described above, the connection projections 5e of the driven gear 5 illustrated in FIG. 4B and the connection recesses 10d of the intermittent input gear 10 illustrated in FIG. 4A are connected to each other. Thus, the intermittent input gear 10 is also rotated concurrently with the start of rotation of the driven gear 5. At this time, as illustrated in FIG. 8C, driving force is prevented from being transmitted from a second input gear portion 10b of the intermittent input gear 10 to a second output gear portion 11b of the intermittent output gear 11, and hence the intermittent output gear 11 is stopped.

Figure 9A:
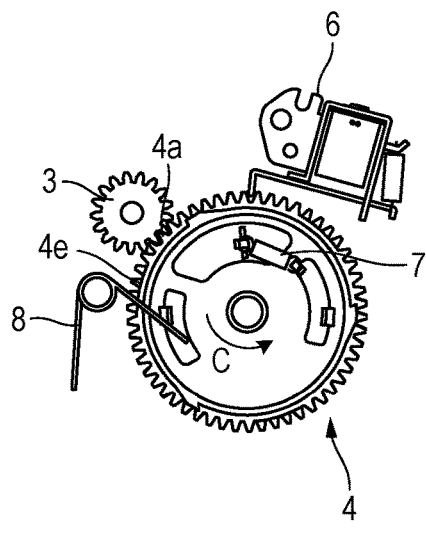
FIG. 9A, FIG. 9B, and FIG. 9C are views for illustrating a state in which driving force is transmitted from the driving gear to the intermittent output gear.
Figure 9B:
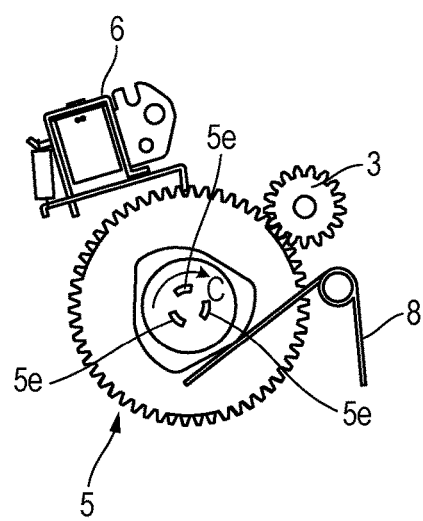
Figure 9C:
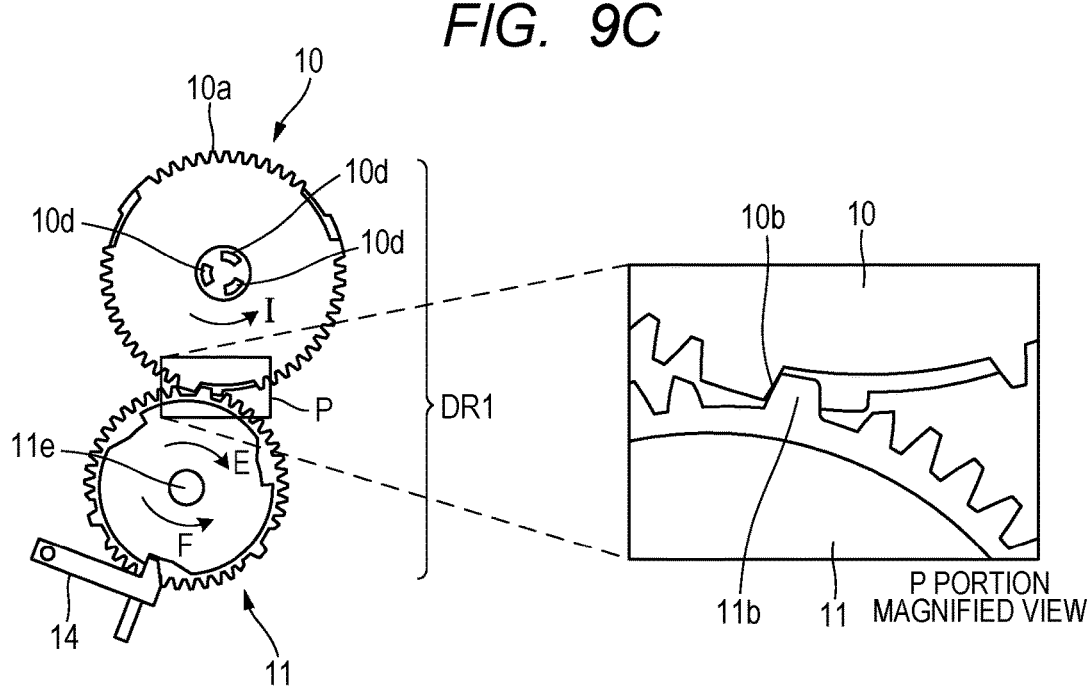

FIG. 9A to FIG. 9C are views for illustrating a state in which driving force is transmitted from the driving gear 3 to the intermittent output gear 11. As illustrated in FIG. 9A, in this state, the trigger gear portion 4a, the driven gear portion 5a, and the driving gear 3 are engaged. Then, transmission of driving force from the driving gear 3 to the intermittent output gear 11 is started. The intermittent input gear 10, having received driving force from the driven gear 5, is rotated in the direction of the arrow I, and the second input gear portion 10b is brought into contact with the second output gear portion 11b of the intermittent output gear 11, thereby starting transmission of driving force from the driven gear 5 to the intermittent output gear 11. At this time, for the first time, driving force is transmitted to the driven member R side (driven member side) which is an output destination of the driving force.

Figure 10A:
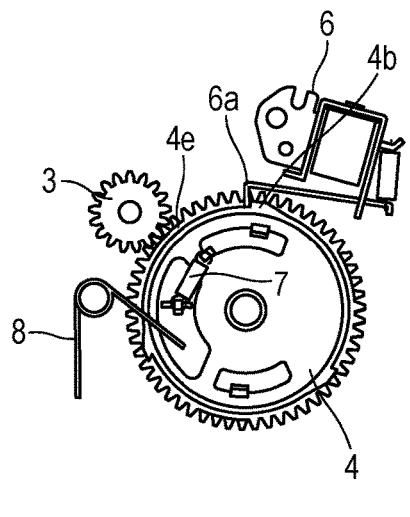
FIG. 10A, FIG. 10B, and FIG. 10C are views for illustrating a state in which the trigger gear is returned to a home position.
Figure 10B:
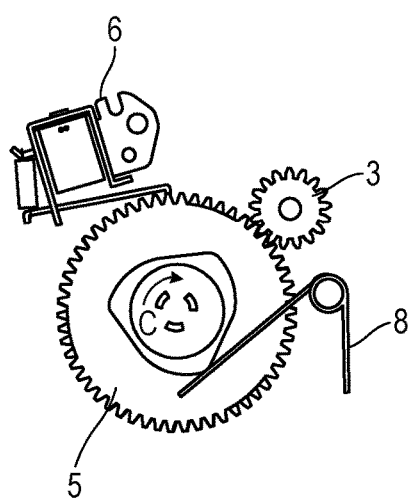
Figure 10C:
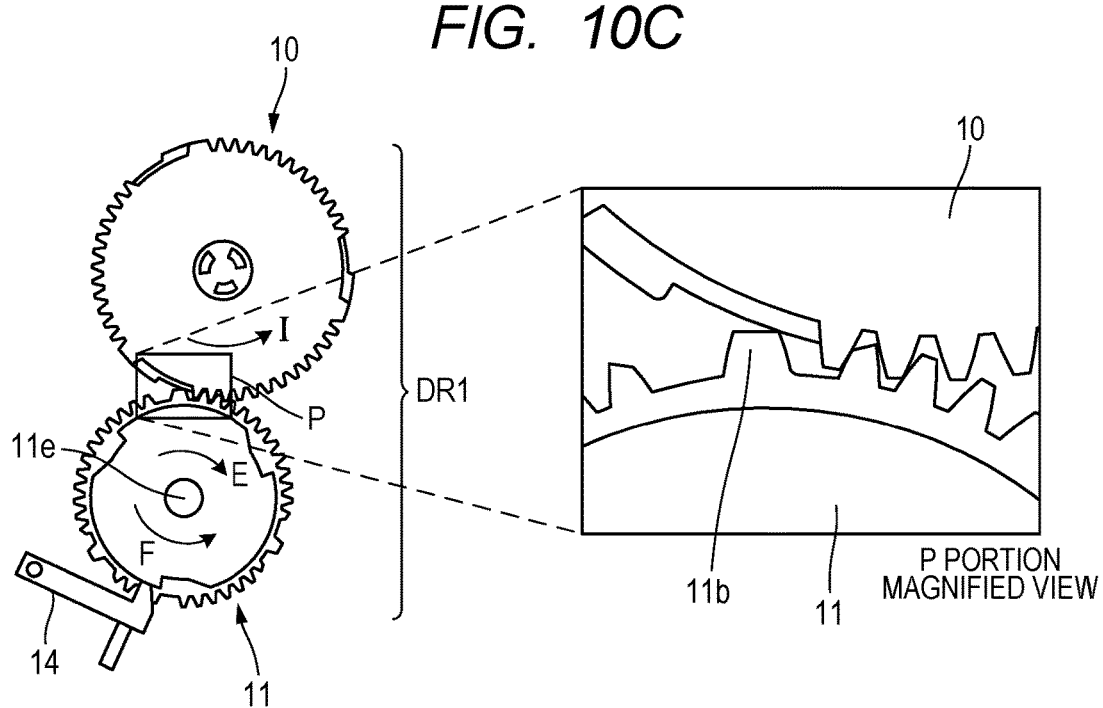

FIG. 10A to FIG. 10C are views for illustrating a state in which the trigger gear 4 is returned to the home position. Specifically, those are views for illustrating a state in which the trigger gear 4 is rotated by one-third to cause the locking portion 4b to be locked by the locking claw 6a of the solenoid 6 to thereby cause the trigger gear 4 to return to the home position (see FIG. 7A). At this time, the trigger toothless portion 4e of the trigger gear 4 is already opposed to the driving gear 3, and hence driving force is prevented from being transmitted from the driving gear 3 to the trigger gear 4. Meanwhile, the driven gear 5 is rotated with a delay by the amount of four teeth as compared to the trigger gear 4. Thus, the driven gear 5 and the driving gear 3 are still engaged with each other, and driving force is transmitted from the driving gear 3 to the driven gear 5. Further, as illustrated in FIG. 10C, the intermittent input gear 10 and the intermittent output gear 11 are engaged with each other. The intermittent input gear 10 is rotated in the direction I, and the intermittent output gear 11 is rotated in the direction E (rotation direction).

Figure 11A:
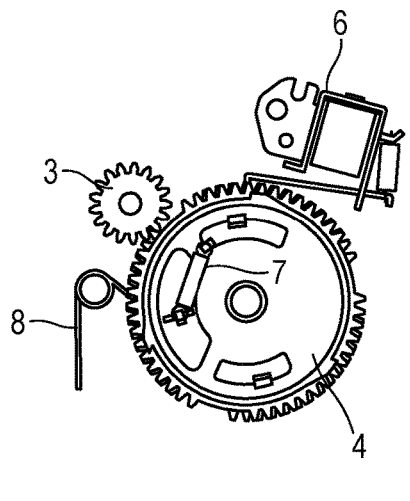
FIG. 11A, FIG. 11B, and FIG. 11C are views for illustrating a state in which driving force is prevented from being transmitted from the intermittent input gear to the intermittent output gear.
Figure 11B:
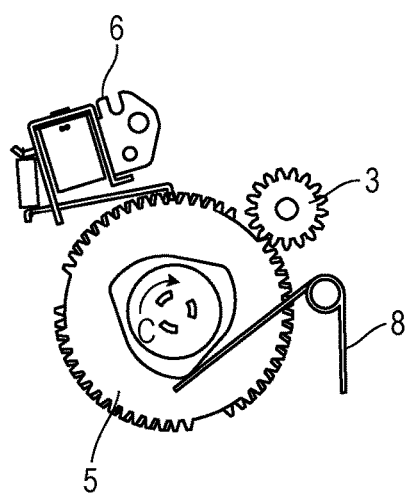
Figure 11C:
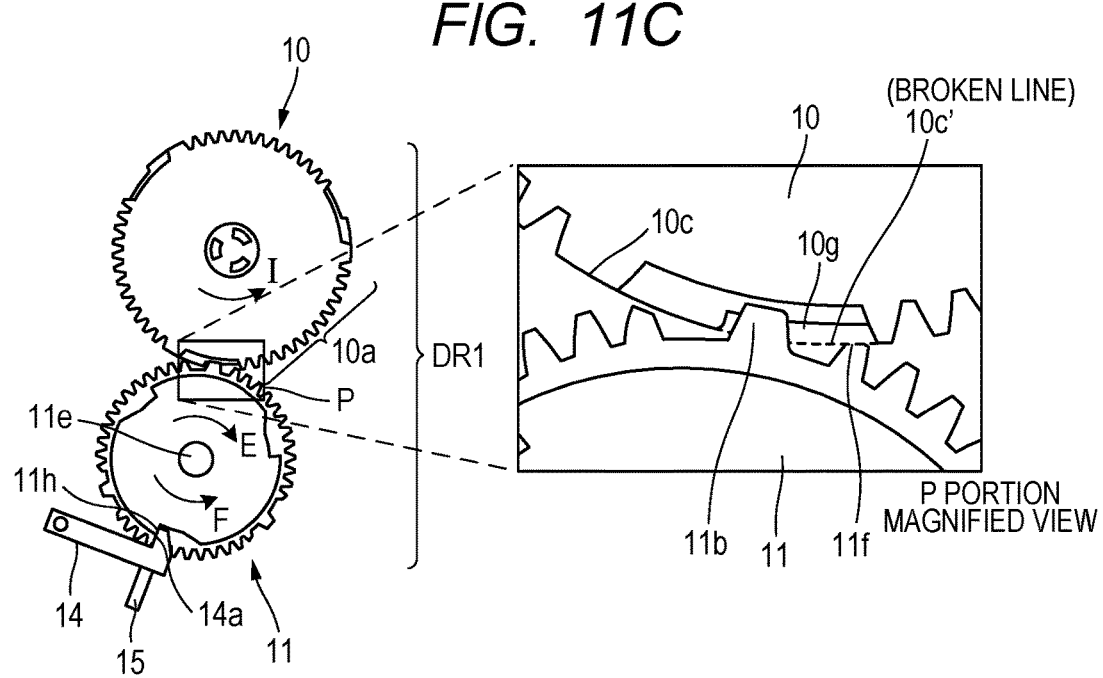

FIG. 11A to FIG. 11C are views for illustrating a state in which driving force is prevented from being transmitted from the intermittent input gear 10 to the intermittent output gear 11. Specifically, as illustrated in FIG. 11C, it is a state in which the engagement between the intermittent input gear 10 and the intermittent output gear 11 is terminated, and a first input gear portion 10a passes a downstream arc portion 11f of the intermittent output gear 11, to thereby cut transmission of driving force from the intermittent input gear 10 to the intermittent output gear 11. At this time, the intermittent output gear 11 is at the home position (see FIG. 7C). Further, at this time, as illustrated in FIG. 11A and FIG. 11B, the driven gear 5 and the driving gear 3 are engaged with each other, and driving force is transmitted from the driving gear 3 to the intermittent input gear 10 side (first rotary member side).

Figure 12A:
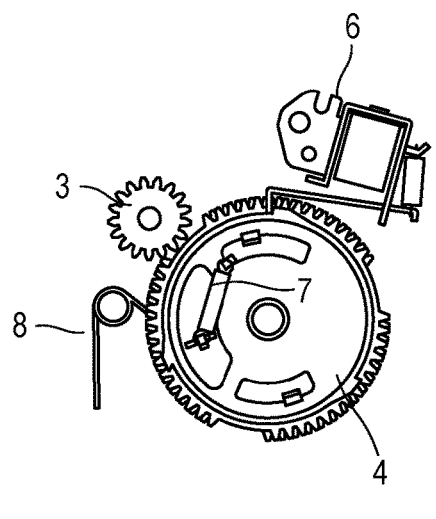
FIG. 12A, FIG. 12B, and FIG. 12C are views for illustrating a state in which transmission of driving force from the driving gear to the driven gear is cut.
Figure 12B:
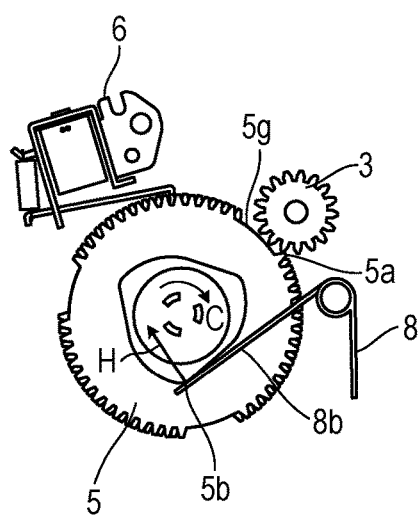
Figure 12C:
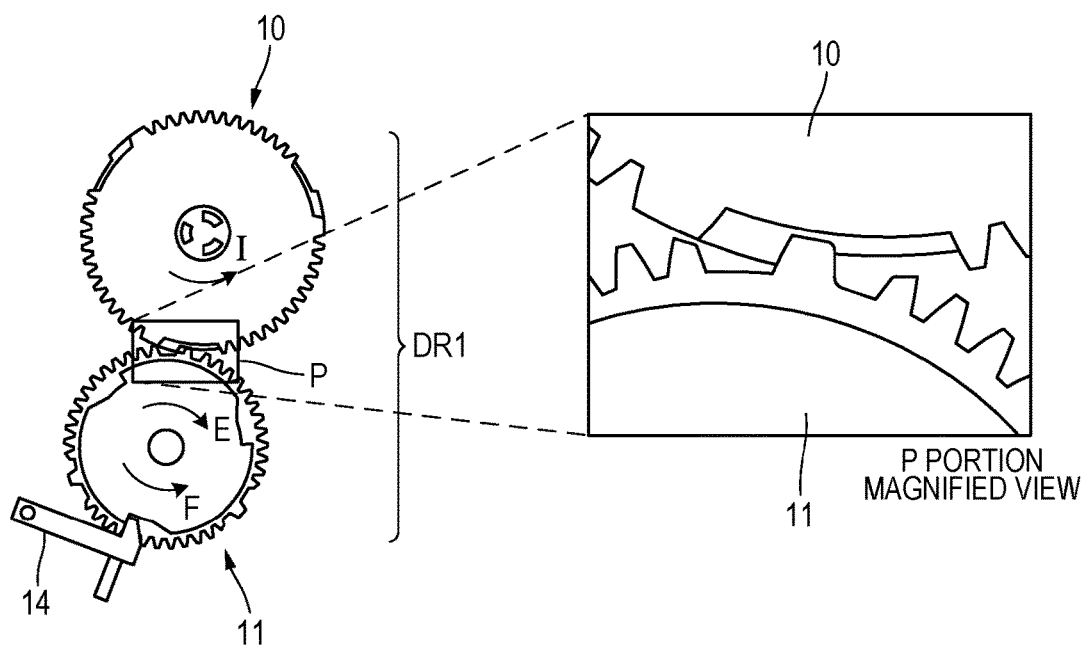

FIG. 12A to FIG. 12C are views for illustrating a state in which transmission of driving force from the driving gear 3 to the driven gear 5 is cut. Specifically, as illustrated in FIG. 12B, it is a state in which the last tooth of the driven gear portion 5a of the driven gear 5 is pushed out by the driving gear 3, and transmission of driving force from the driving gear 3 to the driven gear 5 is cut. At this time, transmission of driving force from the driving gear 3 to the driven gear 5 is stopped before the driven toothless portion 5g and the driving gear 3 are completely opposed to each other, and hence there may be a case where sound occurs due to a small collision between the rotating driving gear 3 and a tip of the driven gear portion 5a.

To prevent occurrence of such a matter, the driven gear 5 needs to be further rotated without being dependent on driving force from the driving gear 3. Thus, the movable arm 8b of the torsion spring 8 presses, with its elastic force, the cam portion 5b in a direction of the arrow H, to thereby cause the driven gear 5 to be rotated by a predetermined amount until the driven gear 5 reaches the home position (see FIG. 7B). With this, the driven toothless portion 5g and the driving gear 3 are completely opposed to each other. At this time, when the driven gear 5 is to be rotated to the home position, the intermittent input gear 10 is also rotated by the same amount, with the result that the intermittent input gear 10 is also brought to the home position (see FIG. 7C). The clutch X is basically operated in the manner described above.

Figure 6:
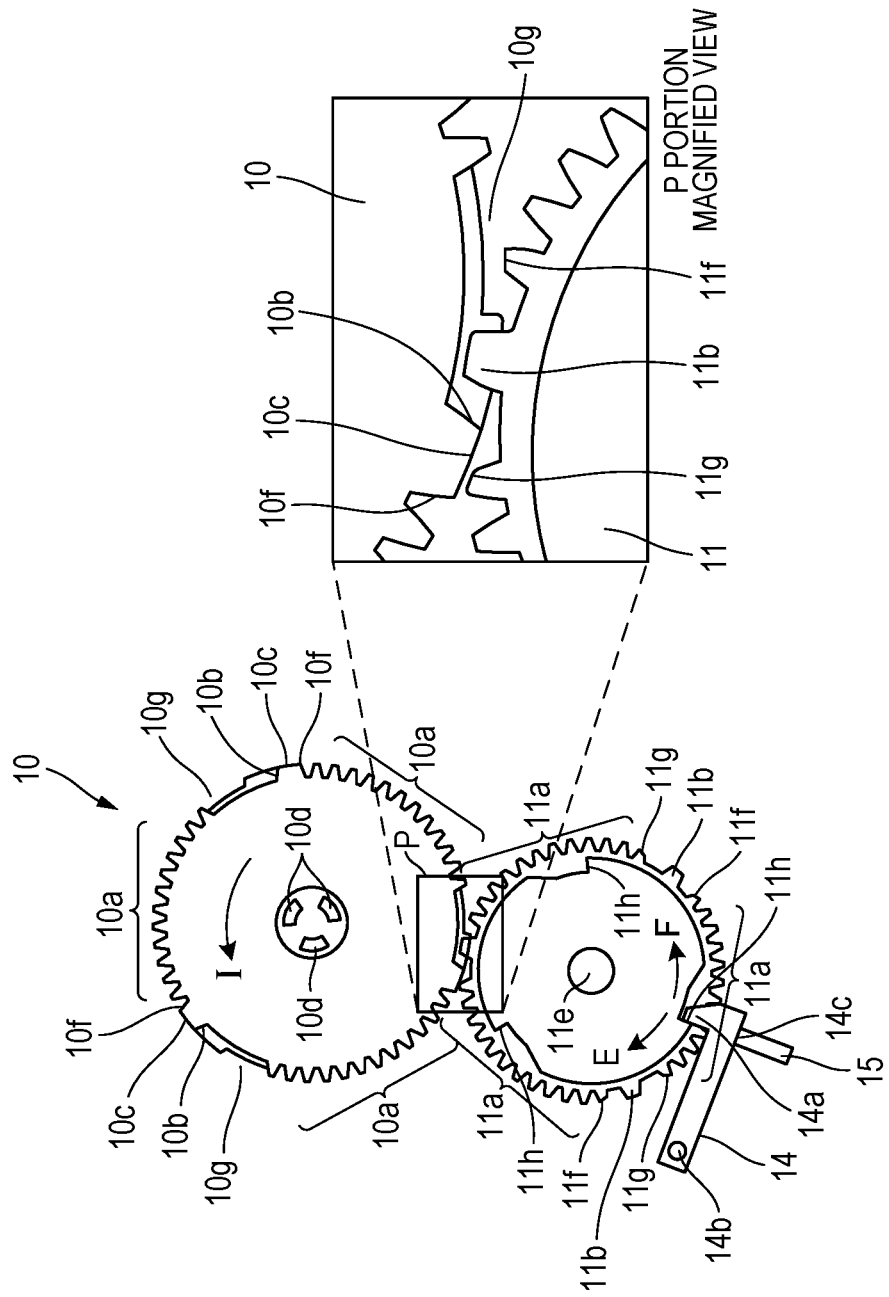
FIG. 6 is a view for illustrating the intermittent input gear, an intermittent output gear, and a reverse preventing lever.

Next, the most characteristic configuration of this embodiment is described. As illustrated in FIG. 6, the intermittent input gear 10 has first input gear portions 10a configured to transmit driving force to the intermittent output gear 11, second input gear portions 10b, and regulation portions 10c configured to regulate rotation of the intermittent output gear 11 in the direction E. Further, the intermittent input gear 10 has the connection recesses 10d configured to be engaged with the connection projections 5e (see FIG. 4B) of the driven gear 5, and non-contact recesses 10g which are concave non-contact portions formed at locations adjacent to the regulation portions 10c. The non-contact recesses 10g are described later. As illustrated in FIG. 1, the second input gear portions 10b are formed adjacent to the regulation portions 10c, respectively. Further, the second input gear portions 10b are formed, respectively on one end of the non-contact recesses 10g in the rotation direction. Further, in a thickness direction of the gear, a thickness of the second input gear portion 10b is about a half of a thickness of the first input gear portion 10a. The second input gear portion 10b is configured to be engaged with the second output gear portion 11b of the intermittent output gear 11.

As illustrated in FIG. 6, the regulation portion 10c is a convex arc surface (substantially arc shape), and a center axis line of the arc surface matches with a rotation center axis line of the intermittent input gear 10. Further, an arc diameter of the regulation portion 10c of the intermittent input gear 10 is substantially equal to a tooth tip circle diameter of the first input gear portion 10a. Further, a center axis line of the arc surface of the regulation portion 10c, which is a convex arc surface, matches with a center axis line of the arc surface of the tooth tip of the first input gear portion 10a. On a side opposite to the second input gear portion 10b on the tooth having the regulation portion 10c, there is formed a tooth surface 10f of a module as in the first input gear portion 10a. An intersecting portion connecting the regulation portion 10c, which is a convex arc surface, and the tooth surface 10f is formed smoothly. Further, arrangement of phases of the second input gear portions 10b and phases of the tooth surfaces 10f is the same as the phase arrangement of the first input gear portions 10a.

The intermittent output gear 11 has first output gear portions 11a configured to be engaged with the first input gear portions 10a, and second output gear portions 11b configured to be engaged with the second input gear portions 10b. Further, the intermittent output gear 11 has three downstream arc portions 11f, three upstream arc portions 11g serving as contact portions, and three locked portions 11h. The downstream arc portion 11f is formed by partially cutting out a tip of the tooth surface of the first output gear portion 11a. Further, the downstream arc portion 11f is a concave arc surface and is formed so as to be prevented from being brought into contact with the regulation portions 10c. The locked portions 11h are described later. Further, a rotary shaft 11e is connected to the driven member R (see FIG. 2A).

In the intermittent output gear 11, the second output gear portion 11b is formed between the downstream arc portion 11*f* and the upstream arc portion 11*g*. Further, phases of the second output gear portions 11*b* are the same as phases of the teeth of the first output gear portions 11*a*. As illustrated in FIG. 1, in the thickness direction of the gear, a thickness of the second output gear portion 11*b* is about a half of a thickness of the first output gear portion 11*a*. Further, the second output gear portion 11*b* is configured to be engaged with the second input gear portion 10*b* of the intermittent input gear 10. The intermittent input gear 10 and the intermittent output gear are assembled with their relative rotational phases matched with each other so that the second input gear portions 10*b* and the second output gear portions 11*b* are engaged with each other and so that the regulation portions 10*c* and the upstream arc portions 11*g* are along with each other.

As illustrated in FIG. 6, the non-contact recess 10*g* of the intermittent input gear 10 is formed by cutting out downstream of the regulation portion 10*c* in the rotation direction of the intermittent input gear 10 to have a concave shape so that the downstream arc portion 11*f* of the intermittent output gear 11 is prevented from being brought into contact with the intermittent input gear 10. Further, in the intermittent output gear 11, three locked portions 11*h* are formed on an inner side of the first output gear portions 11*a* in a radial direction of the intermittent output gear 11. A locking portion 14*a* of the reverse preventing lever 14 serving as a suppressing member is engaged with the locked portion 11*h*, to thereby prevent rotation of the intermittent output gear 11 in the direction F (opposite direction) when the intermittent output gear 11 is under the state of FIG. 6. Further, the reverse preventing lever 14 is rotated about a rotary shaft 14*b* as a support point to cause a pressure portion 14*c* to be pressed by a lever spring 15, thereby pressing the intermittent output gear 11. Herein, the mechanism configured to prevent rotation of the intermittent output gear 11 in a direction reverse to the direction of rotation caused by the transmission of driving force from the driving gear 3 is referred to as a reverse preventing mechanism.

In a case where load torque exerted on the driven member R illustrated in FIG. 2A is small, as described above, an operation of the clutch X is performed. However, in a case where the driven member R is the primary transfer roller 34 as in this embodiment, large torque may be exerted on the member for transmission of driving force during contact and separation operations of the primary transfer roller 34. That is, in a case where transmission of driving force to the intermittent output gear 11 causes transmission of driving force to the driven member R, the driving force is transmitted to the driven member R while causing deformation or torsion in components of the driven member R or the intermittent output gear 11. Thus, the intermittent output gear 11 is rotated while receiving a force in a direction of the arrow F of FIG. 9C for recovering the deformation or torsion caused by the load torque (hereinafter referred to as "back tension").

In a case where, unlike this embodiment, the non-contact recesses 10*g* are not formed in the intermittent input gear 10, and the reverse preventing lever 14 and the lever spring 15 are not arranged, the intermittent output gear 11 is rotated in the direction of the arrow F at the timing illustrated in FIG. 11C. Herein, the timing illustrated in FIG. 11C is a timing at which the last tooth of the first input gear portion 10*a* of the intermittent input gear 10 passes the downstream arc portion 11*f* of the intermittent output gear 11 to cut transmission of driving force from the intermittent input gear 10 to the intermittent output gear 11. Further, in this case, the downstream arc portion 11*f* of the intermittent output gear 11 is brought into contact with a regulation portion 10*c'* (portion indicated by the broken line portion, which is a portion not provided in this embodiment) of the intermittent input gear 10, to thereby stop the rotation in the direction F. Therefore, in this case, the regulation portion 10*c'* and the downstream arc portion 11*f* are brought into contact with each other, and hence the intermittent input gear 10 always receives slide resistance caused by the back tension exerted on the intermittent output gear 11 until the operation of the clutch X is completed.

Further, in this state, after the driven toothless portion 5*g* of the driven gear 5 and the driving gear 3 are opposed to each other to cut transmission of driving force from the driving gear 3 to the driven gear 5, the driven gear 5 and the intermittent input gear 10 need to be rotated to the home position by the torsion spring 8. In this case, the torsion spring 8 needs to overcome slide resistance caused by the back tension to rotate the driven gear 5 in the direction C (see FIG. 12B) and rotate the intermittent input gear 10 in the direction I (see FIG. 12C). Thus, the spring pressure of the torsion spring 8 needs to be increased, and hence large sound may occur when the movable arm 8*b* of the torsion spring 8 and the cam portion 5*b* of the driven gear 5 are brought into contact with each other.

However, in this embodiment, the reverse preventing lever 14 is arranged as illustrated in FIG. 11C. Thus, even when the force in the direction F caused by the back tension is exerted on the intermittent output gear 11, engagement of the locking portion 14*a* of the reverse preventing lever 14 with the locked portion 11*h* of the intermittent output gear 11 may prevent the rotation of the intermittent output gear 11 in the direction F. Further, the intermittent input gear 10 has the non-contact recesses 10*g*. Therefore, even when the intermittent output gear 11 is rotated to some extent in the direction F due to factors such as variation in the dimensions of the locked portion 11*h* of the intermittent output gear 11 or the reverse preventing lever 14, the downstream arc portion 11*f* of the intermittent output gear 11 is prevented from being brought into contact with the intermittent input gear 10. That is, torque transmitted from the driven member R to the intermittent input gear 10 is cut. The locked portion 11*h* and the reverse preventing lever 14 are engaged immediately after transmission of driving force from the intermittent input gear 10 to the intermittent output gear 11 is cut.

Therefore, at the timing illustrated in FIG. 12A to FIG. 12C, there is no influence of the back tension exerted on the driven member R (see FIG. 2A) or the intermittent output gear 11. Herein, the timing illustrated in FIG. 12A to FIG. 12C is a timing of rotating the driven gear 5 in the direction C and rotating the intermittent input gear 10 in the direction I so as to move the driven gear 5 and the intermittent input gear 10 to the home positions with the force of the torsion spring 8.

That is, even when the load torque is generated on the driving force transmission path from the intermittent output gear 11 to the driven member R, there is no influence on the intermittent input gear 10. Therefore, it is only necessary that the elastic force of the torsion spring 8 be the force which overcomes the force for rotating the intermittent input gear 10 and the driven gear 5 and the elastic force of the trigger spring 7 (see FIG. 12A). With such a configuration, the elastic force of the torsion spring 8 can be set relatively smaller, thereby being capable of reducing sound which may occur when the movable arm 8*b* of the torsion spring 8 and the cam portion 5*b* of the driven gear 5 are brought into contact with each other.

As described above, in this embodiment, the non-contact recess 10g are formed downstream of the regulation portion 10c in the rotation direction of the intermittent input gear 10, and the locked portion 11h is formed on the intermittent output gear 11. Further, the engagement of the reverse preventing lever 14 with the locked portion 11h stops reverse rotation of the intermittent output gear 11 and brings the intermittent input gear 10 and the intermittent output gear 11 into the non-contact state. With this, the elastic force of the torsion spring 8 for rotation of the driven gear 5 to the home position can be reduced without the influence of the load torque generated on the driving force transmission path from the intermittent output gear 11 to the driven member R. Therefore, reduction in size, cost, and sound with regard to the image forming apparatus can be achieved.

Further, in this embodiment, the reverse preventing lever 14 is used to prevent the reverse rotation of the intermittent output gear 11. However, a one-way clutch may be arranged for the intermittent output gear 11. Further, in a case where the reverse rotation amount of the intermittent output gear 11 by the load torque of the driven member R is apparent in advance, the reverse rotation preventing unit may be omitted, and the shape of the non-contact recess 10g formed in the intermittent input gear 10 may be adjusted. With this, even when the back tension exerted on the intermittent output gear 11 is released (even when the intermittent output gear 11 is reversely rotated), the same effect can be obtained by preventing the intermittent output gear 11 from being brought into contact with the intermittent input gear 10.

Second Embodiment

Next, a second embodiment of the present invention is described with reference to FIG. 15 to FIG. 20. In this embodiment, the basic configurations of the image forming apparatus and the clutch X are the same as those of the first embodiment. Therefore, in the second embodiment, the portions having the same functions as those of the first embodiment are denoted by the same reference symbols, and description thereof is omitted.

Figure 15:
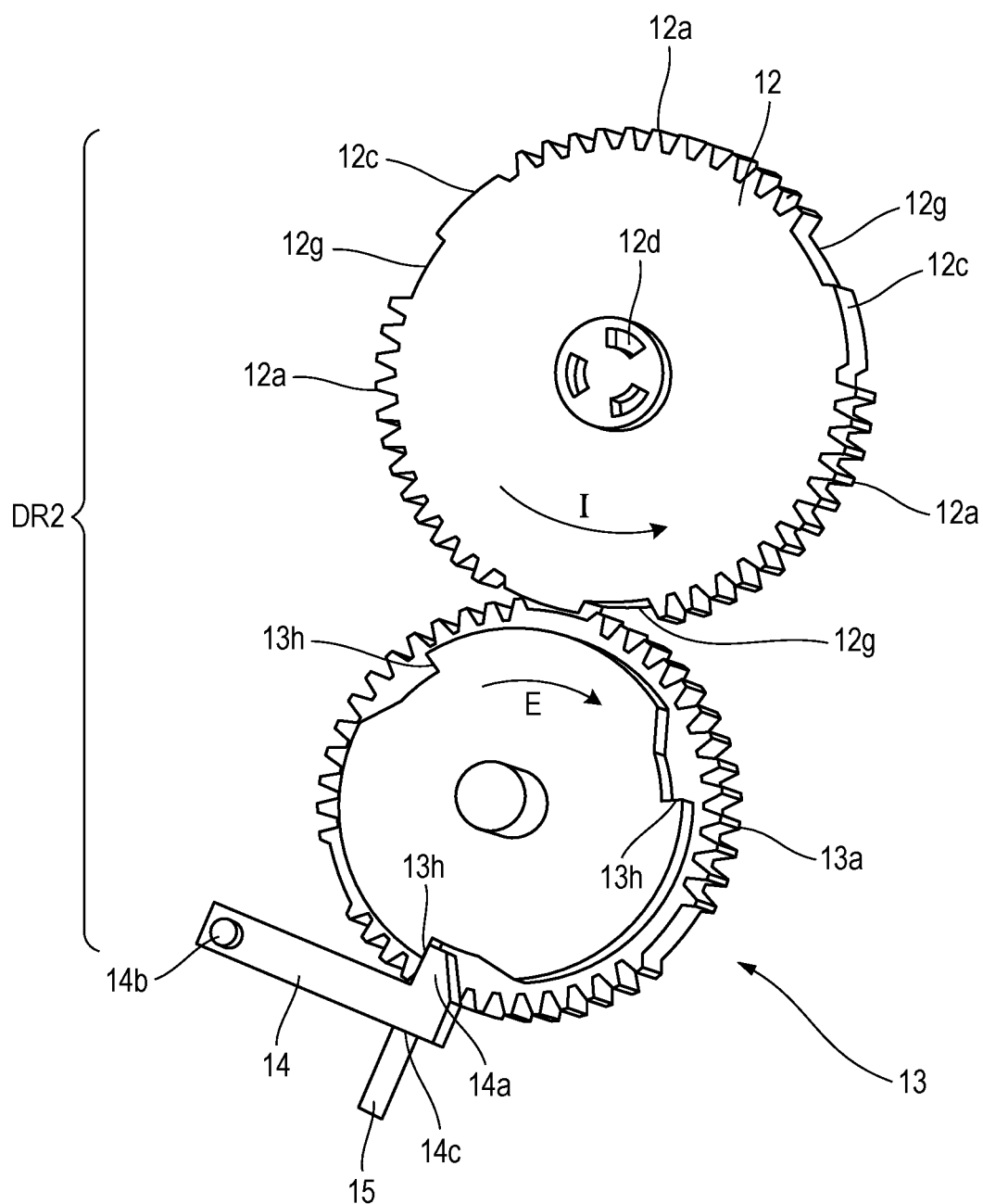
FIG. 15 is a perspective view for illustrating a gear pair, a reverse preventing lever, and a lever spring according to a second embodiment of the present invention.
Figure 16:
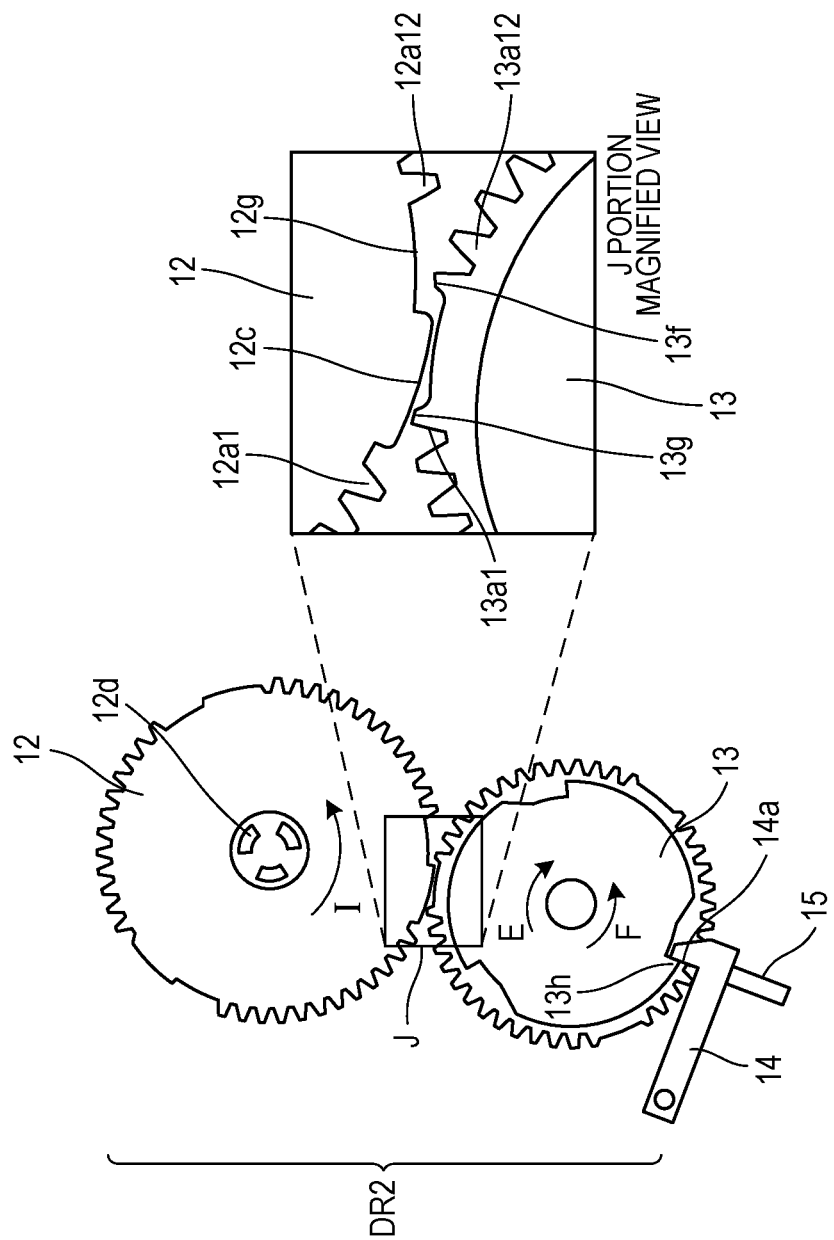
FIG. 16 is a view for illustrating the gear pair at a home position.

FIG. 15 is a perspective view for illustrating a gear pair DR2, the reverse preventing lever 14, and the lever spring 15 according to the second embodiment. Further, FIG. 16 is a view for illustrating the gear pair DR2 at the home position. The gear pair DR2 includes an intermittent input gear 12 and an intermittent output gear 13. The intermittent input gear 12 has first input gear portions 12a configured to transmit driving force to the intermittent output gear 13, and regulation portions 12c configured to regulate rotation of the intermittent output gear 13 in the direction of the arrow E. Further, the intermittent input gear 12 has connection recesses 12d configured to input driving force to the intermittent input gear 12, and non-contact recesses 12g formed at locations adjacent to the regulation portions 12c.

As illustrated in FIG. 16, the regulation portion 12c according to this embodiment is a convex arc surface which is concentric with a rotation center of the intermittent input gear 12. Further, the regulation portion 12c is a convex arc surface having a pitch circle radius of the intermittent input gear 12 as a curvature radius. The non-contact recess 12g is formed by cutting out a downstream portion of the regulation portion 12c in the rotation direction of the intermittent input gear 12 to have a concave shape so as to prevent downstream arc portions 13f of the intermittent output gear 13 from being brought into contact with the intermittent input gear 12.

In this embodiment, the intermittent input gear 12 has a pitch circle diameter corresponding to fifty-four teeth. The number of teeth of the first input gear portions 12a is thirty six. The regulation portion 12c and the non-contact recesses 12g have a size corresponding to six teeth, and are formed at three locations. Further, the first input gear portions 12a each having the size corresponding to twelve teeth are formed at three locations so that the regulation portions 12c and the non-contact recesses 12g are placed therebetween. Teeth 12a1 to 12a12 of the first input gear portion 12a are formed in the order of transmitting driving force to the intermittent output gear 13. The intermittent output gear 13 has first output gear portions 13a configured to be engaged with the first input gear portions 12a of the intermittent input gear 12, downstream arc portions 13f each cut out along the shape of the regulation portion 12c, upstream arc portions 13g, and locked portions 13h. The downstream arc portions 13f and the upstream arc portions 13g are each cut out along the shape of the regulation portion 12c, and curvatures of the downstream arc portion 13f and the upstream arc portion 13g are smaller than a curvature of the regulation portion 12c.

In this embodiment, the intermittent output gear 13 has the pitch circle diameter corresponding to forty-five teeth. The number of teeth of the first output gear portions 13a is thirty six. The part of the intermittent output gear 13 corresponding to three teeth is formed into the toothless shape at the three locations to form the downstream arc portions 13f and the upstream arc portions 13g. Further, the first output gear portion 13a is also formed to have a size corresponding to twelve teeth at three locations while placing the toothless shape therebetween. Teeth 13a1 to 13a12 of the first output gear portion 13a are formed in the order of transmitting driving force from the intermittent input gear 12. Herein, in this embodiment, in a case where the intermittent input gear 12 is rotated by one-third, the intermittent output gear 13 is also rotated by one-third.

Figure 17:
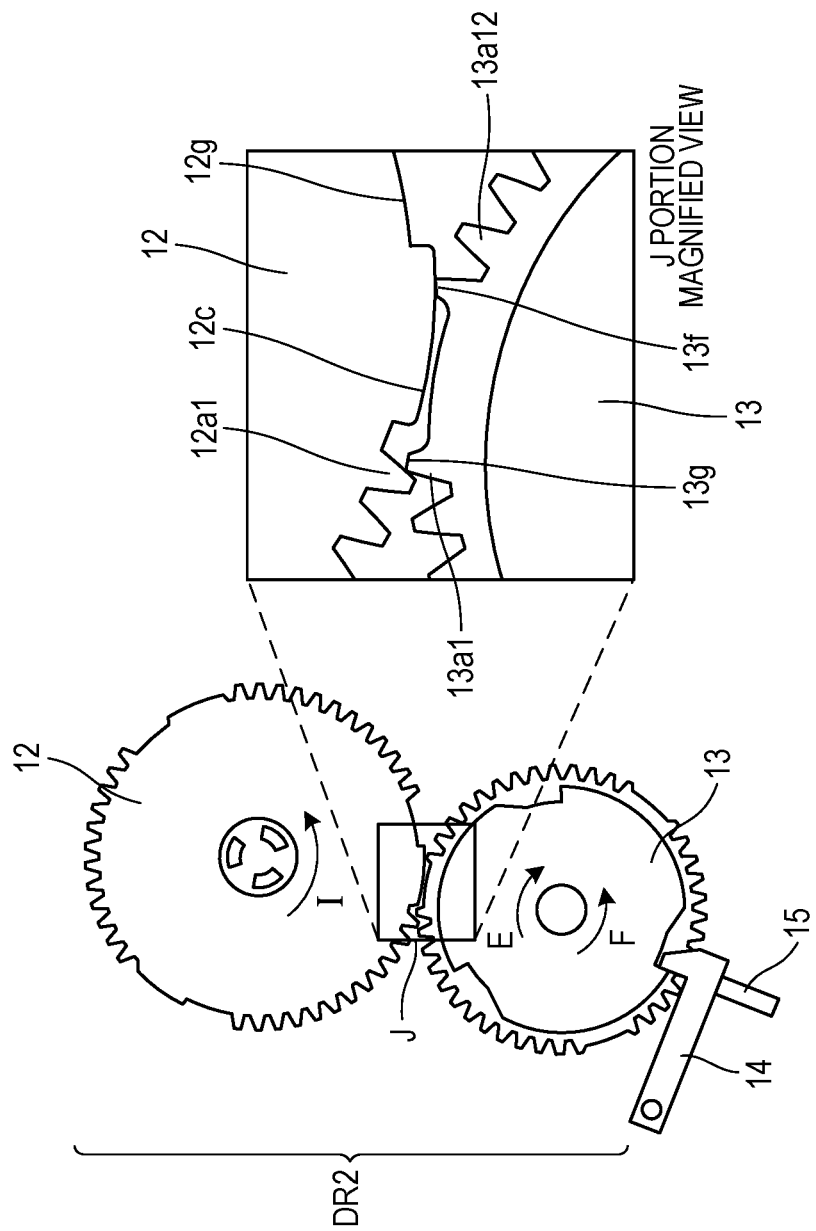
FIG. 17 is a view for illustrating a state in which transmission of driving force from the intermittent input gear to the intermittent output gear is started.

Next, an operation of transmitting driving force from the intermittent input gear 12 to the intermittent output gear 13 is described with reference to FIG. 16 to FIG. 20. Herein, in this embodiment, the configuration and operation of transmitting driving force to the intermittent input gear 12 are the same as those of the first embodiment. As described above, FIG. 16 is a view for illustrating the clutch X at the home position. FIG. 17 is a view for illustrating a state in which the intermittent input gear 12 is rotated in the direction of the arrow I to start transmission of the driving force to the intermittent output gear 13.

In this embodiment, a curvature radius of the regulation portion 12c is set to be equal to the pitch circle radius of the intermittent input gear 12. Further, the curvatures of the downstream arc portion 13f and the upstream arc portion 13g of the intermittent output gear 13 are smaller than the curvature of the regulation portion 12c. Therefore, the first input gear portion 12a1 of the intermittent input gear 12 can be engaged with the first output gear portion 13a1 of the intermittent output gear 13. Then, transmission of driving force is started from the first input gear portion 12a1 of the intermittent input gear 12 to the first output gear portion 13a1 of the intermittent output gear 13. The intermittent output gear 13 starts rotation in the direction of the arrow E. With this, driving force is transmitted to the driven member R which is the output destination of the driving force. At this time, in a case where the load torque generated in the driven member R is large, in the driven member R (not shown), the driving force is transmitted to the driven member R while causing deformation or torsion in components or the intermittent output gear 11.

Figure 18:
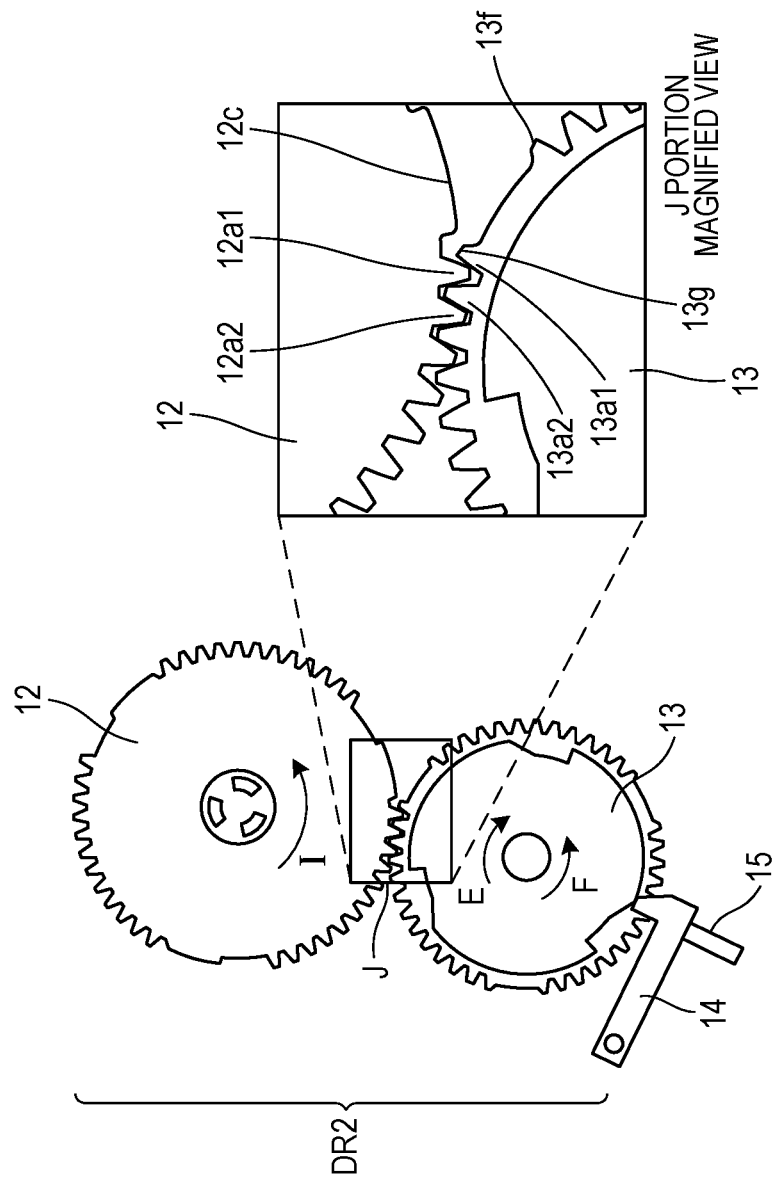
FIG. 18 is a view for illustrating a state in which driving force is transmitted from the intermittent input gear to the intermittent output gear.
Figure 19:
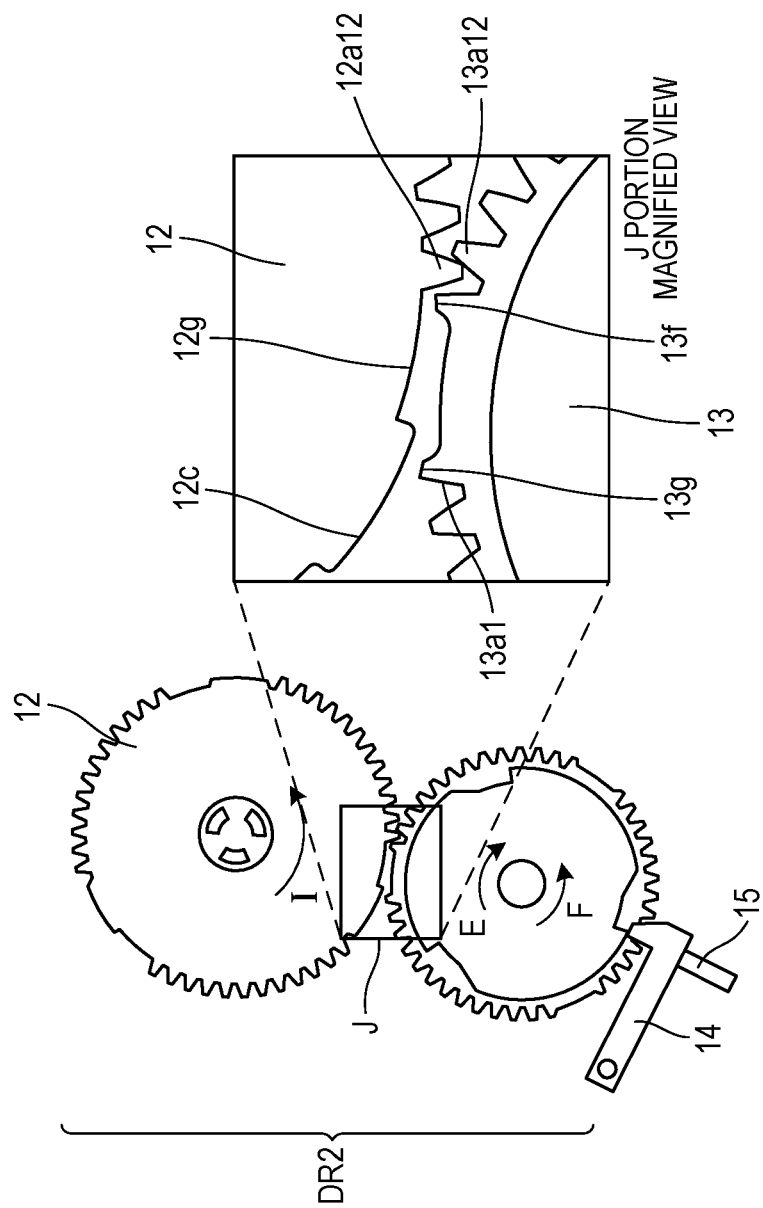
FIG. 19 is a view for illustrating a state immediately before transmission of driving force to the intermittent output gear is cut.
Figure 20:
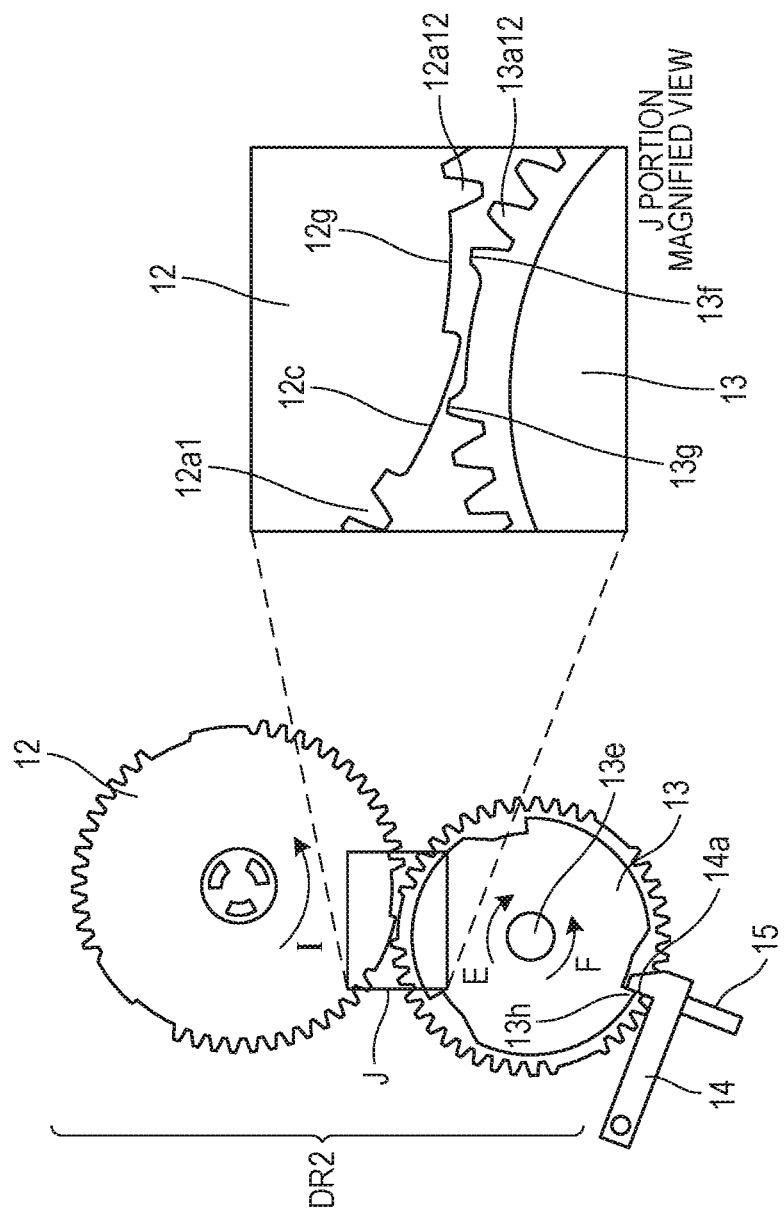
FIG. 20 is a view for illustrating a state in which engagement between the intermittent input gear and the intermittent output gear is cancelled.

FIG. 18 is a view for illustrating a state of the clutch X in which the gear is rotated by the amount corresponding to three teeth from the state of FIG. 17. Further, FIG. 19 is a view for illustrating a state of the clutch X immediately before the intermittent input gear 12 is rotated by about one-third to cut transmission of driving force from the intermittent input gear 12 to the intermittent output gear 13. FIG. 20 is a view for illustrating a state in which engagement between the first input gear portion 12a12, which is the most upstream tooth in the rotation direction of the intermittent input gear 12, and the first output gear portion 13a12, which is the most upstream tooth in the rotation direction of the intermittent output gear 13, is terminated. In this state, transmission of driving force from the intermittent input gear 12 to the intermittent output gear 13 is cut.

As described above, in a case where the load torque exerted on the driven member R (not shown) is large, deformation or torsion occurs in the components in the driven member R (not shown) or the intermittent output gear 13. With this, the back tension is accumulated in the components in the driven member R (not shown) or the intermittent output gear 13. Thus, at the moment at which transmission of driving force from the intermittent input gear 12 to the intermittent output gear 13 is cut, a rotary force is exerted in the direction of the arrow F to the intermittent output gear 13 so as to release the back tension. At this time, the locked portion 13h of the intermittent output gear 13 and the locking portion 14a of the reverse preventing lever 14 are engaged with each other, thereby suppressing the rotation of the intermittent output gear 13 in the direction of the arrow F.

Further, the intermittent input gear 12 has the non-contact recesses 12g. The non-contact recess 12g is formed by cutting out the downstream of the regulation portion 12c in the rotation direction of the intermittent input gear 12 to have a concave shape. Therefore, even when the intermittent output gear 11 is rotated to some extent more than estimated in the direction of the arrow F by the back tension due to the variation in the dimensions of the locked portions 13h and the locking portion 14a, the intermittent output gear 13 and the intermittent input gear 12 are prevented from being brought into contact with each other. Thus, the back tension does not become the load resistance against the rotation of the intermittent input gear 12. Also in this embodiment, as in the first embodiment, the cam portion 5b is pressed in the direction of the arrow H by the elastic force of the torsion spring 8 so that the driven toothless portion 5g and the driving gear 3 are completely opposed to each other after transmission of driving force from the driving gear 3 to the driven gear 5 is cut. At this time, as in the first embodiment, when the driven gear 5 and the intermittent input gear 12 are returned to the home position (see FIG. 15), the driven gear 5 and the intermittent input gear 12 can be rotated with a small elastic force.

As described above, in this embodiment, the non-contact recess 12g is formed downstream of the regulation portion 12c in the rotation direction of the intermittent input gear 12, and the locked portions 13h are formed in the intermittent output gear 13. With this, the reverse preventing lever 14 and the locked portion 13h are engaged with each other, thereby suppressing reverse rotation of the intermittent output gear 13. Further, the intermittent input gear 12 and the intermittent output gear 13 are brought into the non-contact state, thereby being capable of reducing the elastic force of the torsion spring 8 for rotating the driven gear 5 to the home position without being dependent on the load torque exerted on the driven member R. With this, the image forming apparatus can be reduced in size, cost, and sound.

Further, in this embodiment, the curvature radius of the regulation portion 12c of the intermittent input gear 12 is the pitch circle radius. Further, the curvatures of the downstream arc portion 13f and the upstream arc portion 13g of the intermittent output gear 13 are substantially equal to the curvature of the regulation portion 12c. In the first embodiment, transmission of driving force in the gear pair DR1 is started with use of the second input gear portion 10b of the intermittent input gear 10. However, in the second embodiment, transmission of driving force is started with use of the first input gear portion 12a of the intermittent input gear 12. In the second embodiment, the thickness of the gear is not set to be gradual in the thickness direction of the gear unlike the first embodiment. Thus, the thickness of the gear can be reduced, thereby being capable of reducing the size of the clutch X in the thickness direction of the gear.

In the embodiments described above, the toothless portion is formed as the driven toothless portion 5g in the driven gear 5. However, the present invention is not necessarily limited thereto. For example, the toothless portion may be formed in at least one of the driving gear 3 or the driven gear 5.

Further, in the first embodiment, the toothless portion is formed as the non-contact recess 10g in the intermittent input gear 10. However, the present invention is not necessarily limited thereto. For example, the toothless portion may be formed in at least one of the intermittent input gear 10 or the intermittent output gear 11.

Further, in the second embodiment, the toothless portion is formed as the non-contact recess 12g in the intermittent input gear 12. However, the present invention is not necessarily limited thereto. For example, the toothless portion may be formed in at least one of the intermittent input gear 12 or the intermittent output gear 13.

Further, in the first embodiment, the connection projections 5e and the connection recesses 10d are engaged with each other to transmit the driving force from the driven gear 5 to the intermittent input gear 10. However, the present invention is not necessarily limited thereto. For example, the driven gear 5 and the intermittent input gear 10 may be engaged with each other, to thereby transmit the driving force from the driven gear 5 to the intermittent input gear 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-219603, filed Nov. 9, 2015, which is hereby incorporated by reference herein in its entirety.

What is claimed is:

1. A driving force transmission apparatus, comprising:
    a driving rotary member configured to receive driving force transmitted from a driving force source;
    a driven rotary member configured to rotate through engagement with the driving rotary member, the driven rotary member having a non-engaging portion preventing engagement with the driving rotary member, wherein, in a state in which the driving rotary member and the driven rotary member are opposed to each other through the non-engaging portion, transmission of driving force from the driving rotary member to the driven rotary member is cut;
  a first rotary member configured to rotate in synchronization with the driven rotary member;
  a second rotary member configured to be engaged with the first rotary member to transmit driving force to a driven member; and
  a first elastic member configured to press the driven rotary member with an elastic force at a predetermined position at which the driving rotary member and the driven rotary member are opposed to each other through the non-engaging portion,
  wherein the first rotary member has a non-contact portion at which the first rotary member and the second rotary member are prevented from being brought into contact with each other in the state in which the driving rotary member and the driven rotary member are opposed to each other through the non-engaging portion,
  wherein a gear portion of the first rotary member which is adjacent to the non-contact portion of the first rotary member has a first arc surface and a gear portion of the second rotary member has a second arc surface corresponding to the first arc surface, and
  wherein, in a state in which the first rotary member and the second rotary member are opposed to each other through the non-contact portion, the first arc surface opposes and does not contact the second arc surface.

2. A driving force transmission apparatus according to claim 1, wherein the first rotary member and the second rotary member comprise gears configured to be engaged with each other, and the non-contact portion of the first rotary member comprises a portion missing a gear portion.

3. A driving force transmission apparatus according to claim 1, wherein the non-contact portion has a concave shape.

4. A driving force transmission apparatus according to claim 1, wherein the first arc surface is concentric with a rotation center of the first rotary member.

5. A driving force transmission apparatus according to claim 1,
  wherein the first rotary member further includes:
    a first driving portion configured to drive the second rotary member;
    a second driving portion formed on one end of the non-contact portion in a rotation direction; and
    a regulation portion having the first arc surface, the first arc surface being concentric with a rotation center of the first rotary member and being configured to regulate rotation of the second rotary member,
  wherein the second rotary member further includes:
    a first driven portion configured to be driven by the first driving portion;
    a second driven portion configured to be driven by the second driving portion; and
    at least one contact portion configured to be brought into contact with the regulation portion, and
  wherein the second driving portion is formed adjacent to the regulation portion in a rotation direction of the first rotary member, and the second driven portion is formed adjacent to the contact portion in a rotation direction of the second rotary member.

6. A driving force transmission apparatus according to claim 5,
  wherein the first driving portion and the second driving portion of the first rotary member, and the first driven portion and the second driven portion of the second rotary member comprise gears, and
  wherein the first arc surface of the first rotary member has an arc diameter, which is substantially equal to a tooth tip circle diameter of the gear of the first driving portion.

7. A driving force transmission apparatus according to according to claim 5,
  wherein the first driving portion and the second driving portion of the first rotary member, and the first driven portion and the second driven portion of the second rotary member comprise gears, and
  wherein the first arc surface of the first rotary member has an arc diameter, which is substantially equal to a pitch circle diameter of the gear of the first driving portion.

8. A driving force transmission apparatus according to claim 1, wherein the second rotary member includes a reverse preventing mechanism configured to prevent rotation in a direction reverse to a direction of rotation caused by transmission of driving force from the driving rotary member.

9. A driving force transmission apparatus according to claim 8, wherein the reverse preventing mechanism includes:
  a locked portion formed in the second rotary member; and
  a reverse preventing member configured to lock onto the locked portion to prevent reverse rotation.

10. A driving force transmission apparatus according to claim 9, wherein the locked portion and the reverse preventing member are engaged with each other when the first rotary member and the second rotary member are at a phase of being opposed to each other through the non-contact portion, and the locked portion and the reverse preventing member are engaged with each other immediately after transmission of driving force from the first rotary member to the second rotary member is cut.

11. A driving force transmission apparatus according to claim 1, wherein the non-contact portion configured to cut a force from the driven member side is formed on any one of the first rotary member or the second rotary member, at a plurality of phases in a rotation direction.

12. A driving force transmission apparatus according to claim 1,
  wherein the driven rotary member includes a trigger rotary member which is (i) arranged coaxially with the driven rotary member and (ii) rotatably assembled by predetermined play relative to the driven rotary member, the trigger rotary member including:
    a non-engaging portion formed so as to correspond to the non-engaging portion of the driven rotary member and prevent engagement with the driving rotary member; and
    a driving portion formed so as to be brought into contact with a driven portion formed in the driven rotary member,
  wherein the driving force transmission apparatus further comprises:
    a second elastic member arranged between the driven rotary member and the trigger rotary member and configured to urge the driving portion of the trigger rotary member in a direction of being brought into contact with the driven portion of the driven rotary member; and
    a rotation regulation member configured to regulate rotation of the trigger rotary member in a case where the non-engaging portion of the trigger rotary member is located at the same phase as the non-engaging portion of the driven rotary member, wherein in a state in which the non-engaging portion of the driven rotary member is opposed to the driving rotary member to cut transmission of driving force, the non-engaging portion of the trigger rotary member is held at the same phase as the non-engaging portion by the rotation regulation member, and wherein, in a case where driving force is transmitted by the driving rotary member, regulation of rotation by the rotation regulation member is cancelled such that the trigger rotary member is rotated by a predetermined amount by an elastic force of the second elastic member to cause the trigger rotary member to be engaged with the driving rotary member, and the trigger rotary member is rotated together with the driving rotary member to cause the driving portion of the trigger rotary member to be engaged with the driven portion of the driven rotary member to start transmission of driving force.

13. A driving force transmission apparatus, comprising:
a driving rotary member configured to receive driving force transmitted from a driving force source;
a driven rotary member configured to rotate through engagement with the driving rotary member, the driven rotary member having a non-engaging portion preventing engagement with the driving rotary member, wherein, in a state in which the driving rotary member and the driven rotary member are opposed to each other through the non-engaging portion, transmission of driving force from the driving rotary member to the driven rotary member is cut;
a first rotary member configured to rotate in synchronization with the driven rotary member;
a second rotary member configured to rotate through engagement with the first rotary member to transmit driving force to a driven member;
a first elastic member configured to hold the driven rotary member with an elastic force in the state in which the driving rotary member and the driven rotary member are opposed to each other through the non-engaging portion; and
a reverse preventing mechanism configured to prevent rotation of the second rotary member in a direction reverse to a direction of rotation of the second rotary member with transmission of driving force from the driving rotary member in the state in which the driving rotary member and the driven rotary member are opposed to each other through the non-engaging portion.

14. A driving force transmission apparatus according to claim 13, wherein the first rotary member and the second rotary member comprise gears configured to be engaged with each other.

15. An image forming apparatus comprising:
an image bearing member on which a developer image is formed;
a transfer member configured to transfer the developer image formed on the image bearing member onto a transferred body;
a driving force transmission apparatus of claim 1; and
a contact and separation mechanism configured to (i) bring the transfer member into contact with the image bearing member and (ii) separate the transfer member from an image bearing member, the contact and separation mechanism being driven by the driving force transmitted by the driving force transmission apparatus.

16. An image forming apparatus comprising:
an image bearing member on which a developer image is formed;
a transfer member configured to transfer the developer image formed on the image bearing member onto a transferred body;
a driving force transmission apparatus of claim 13; and
a contact and separation mechanism configured to (i) bring the transfer member into contact with the image bearing member and (ii) separate the transfer member from an image bearing member, the contact and separation mechanism being driven by the driving force transmitted by the driving force transmission apparatus.

17. A driving force transmission apparatus according to claim 1, wherein the first rotary member has a convex portion and a gear portion, wherein height of the convex portion is smaller than that of the gear portion in a radial direction of the first rotary member.

18. A driving force transmission apparatus according to claim 1, wherein the non-contact portion of first rotary member comprises a portion without gears.

19. A driving force transmission apparatus according to claim 18, wherein the portion without gears comprises a portion having a concave shape.

20. A driving force transmission apparatus comprising:
a driving rotary member configured to receive driving force transmitted from a driving force source;
a driven rotary member configured to rotate through engagement with the driving rotary member, the driven rotary member having a non-engaging portion preventing engagement with the driving rotary member, wherein, in a state in which the driving rotary member and the driven rotary member are opposed to each other through the non-engaging portion, transmission of driving force from the driving rotary member to the driven rotary member is cut;
a first rotary member configured to rotate in synchronization with the driven rotary member; and
a second rotary member configured to be engaged with the first rotary member to transmit driving force to a driven member;
an elastic member configured to press the driven rotary member with an elastic force at a predetermined position at which the driving rotary member and the driven rotary member are opposed to each other through the non-engaging portion,
wherein the first rotary member has a non-contact portion at which the first rotary member and the second rotary member are prevented from being brought into contact with each other in the state in which the driving rotary member and the driven rotary member are opposed to each other through the non-engaging portion, and
wherein the driving force transmission apparatus comprises a reverse preventing mechanism configured to prevent rotation of the second rotary member in a direction reverse to a direction of rotation caused by transmission of driving force from the driving rotary member in a state in which the first rotary member and the second rotary member are opposed to each other through the non-contact portion.

21. A driving force transmission apparatus comprising:
a driving rotary member configured to receive driving force transmitted from a driving force source;
a driven rotary member configured to rotate through engagement with the driving rotary member;
an elastic member configured to press the driven rotary member with an elastic force;

a first rotary member configured to rotate in synchronization with the driven rotary member;

a second rotary member configured to be engaged with the first rotary member to transmit driving force to a driven member; and a reverse preventing member configured to prevent rotation of the second rotary member in a direction reverse to a direction of rotation caused by transmission of driving force from the driving rotary member in a state in which the first rotary member and the second rotary member are prevented from being brought into contact with each other.

22. A driving force transmission apparatus comprising:

a driving rotary member configured to receive driving force transmitted from a driving force source;

a driven rotary member configured to rotate through engagement with the driving rotary member, the driven rotary member having a non-engaging portion preventing engagement with the driving rotary member, wherein, in a state in which the driving rotary member and the driven rotary member are opposed to each other through the non-engaging portion, transmission of driving force from the driving rotary member to the driven rotary member is cut;

a first rotary member configured to rotate in synchronization with the driven rotary member; and a second rotary member configured to be engaged with the first rotary member to transmit driving force to a driven member;

an elastic member configured to press the driven rotary member with an elastic force at a predetermined position at which the driving rotary member and the driven rotary member are opposed to each other through the non-engaging portion, wherein the first rotary member has a plurality of non-contact portions at which the first rotary member and the second rotary member are prevented from being brought into contact with each other in the state in which the driving rotary member and the driven rotary member are opposed to each other through the non-engaging portion.

23. A driving force transmission apparatus according to claim 22, wherein the first rotary member has a convex portion and a gear portion, wherein height of the convex portion is smaller than that of the gear portion in a radial direction of the first rotary member.

24. A driving force transmission apparatus according to claim 22, wherein the first rotary member includes a portion without gears.

25. A driving force transmission apparatus according to claim 24, wherein the portion without gears comprises a portion having a concave shape.

* * * * *